United States Patent [19]

Carlton et al.

[11] Patent Number: 4,821,203
[45] Date of Patent: Apr. 11, 1989

[54] COMPUTER ADJUSTABLE CASE HANDLING MACHINE

[75] Inventors: Bernard J. Carlton, Moxee; David R. Downs, Yakima, both of Wash.

[73] Assignee: Marq Packaging Systems, Inc., Yakima, Wash.

[21] Appl. No.: 49,285

[22] Filed: May 12, 1987

[51] Int. Cl.⁴ .......................... G06F 15/46; B31B 3/02
[52] U.S. Cl. ..................................... 364/478; 364/188; 364/471; 364/167.01; 493/25
[58] Field of Search ............... 364/478, 479, 167, 148, 364/188, 471; 271/259; 493/25, 316

[56] References Cited

U.S. PATENT DOCUMENTS

| | | | |
|---|---|---|---|
| 3,866,327 | 2/1975 | Pacini et al. | 33/125 R |
| 4,159,109 | 6/1979 | Watson et al. | 271/259 |
| 4,262,582 | 4/1981 | Sugimoto et al. | 364/471 |
| 4,515,579 | 5/1985 | Beckett | 364/471 |
| 4,516,210 | 5/1985 | Dahlke | 364/471 |
| 4,517,784 | 5/1985 | Beckett | 364/471 |
| 4,545,175 | 10/1985 | Beckett | 364/471 |

*Primary Examiner*—Jerry Smith
*Assistant Examiner*—Paul Gordon

*Attorney, Agent, or Firm*—Christensen, O'Connor, Johnson & Kindness

[57] ABSTRACT

A case handling machine including a programmable controller, i.e., a controller that includes a programmable CPU, for controlling the position of movable elements of the machine based on the size of cases to be handled is disclosed. The CPU is first programmed with the position of each movable element based on the size of each of the cases to be handled. Thereafter, when a box number related to the size of a particular case is inputted to the controller by an operator, the movable elements are automatically moved to the correct position. Since the movable elements are moved along interrelated axes, that could result in a conflict if the movable elements are moved in the wrong order, the controller program includes a subroutine that sets the sequence of axes movement such that conflicts are avoided. Further, movement of the movable machine elements is monitored as they are moved in a manner that senses jams, i.e., the inability of an element to move at the command of speed. In the event of a jam, element movement ends and a jam display is created. The controller uses low cost relay/motor drive systems and the controller program includes compensation for relay closure and motor up-to-speed time delays.

12 Claims, 27 Drawing Sheets

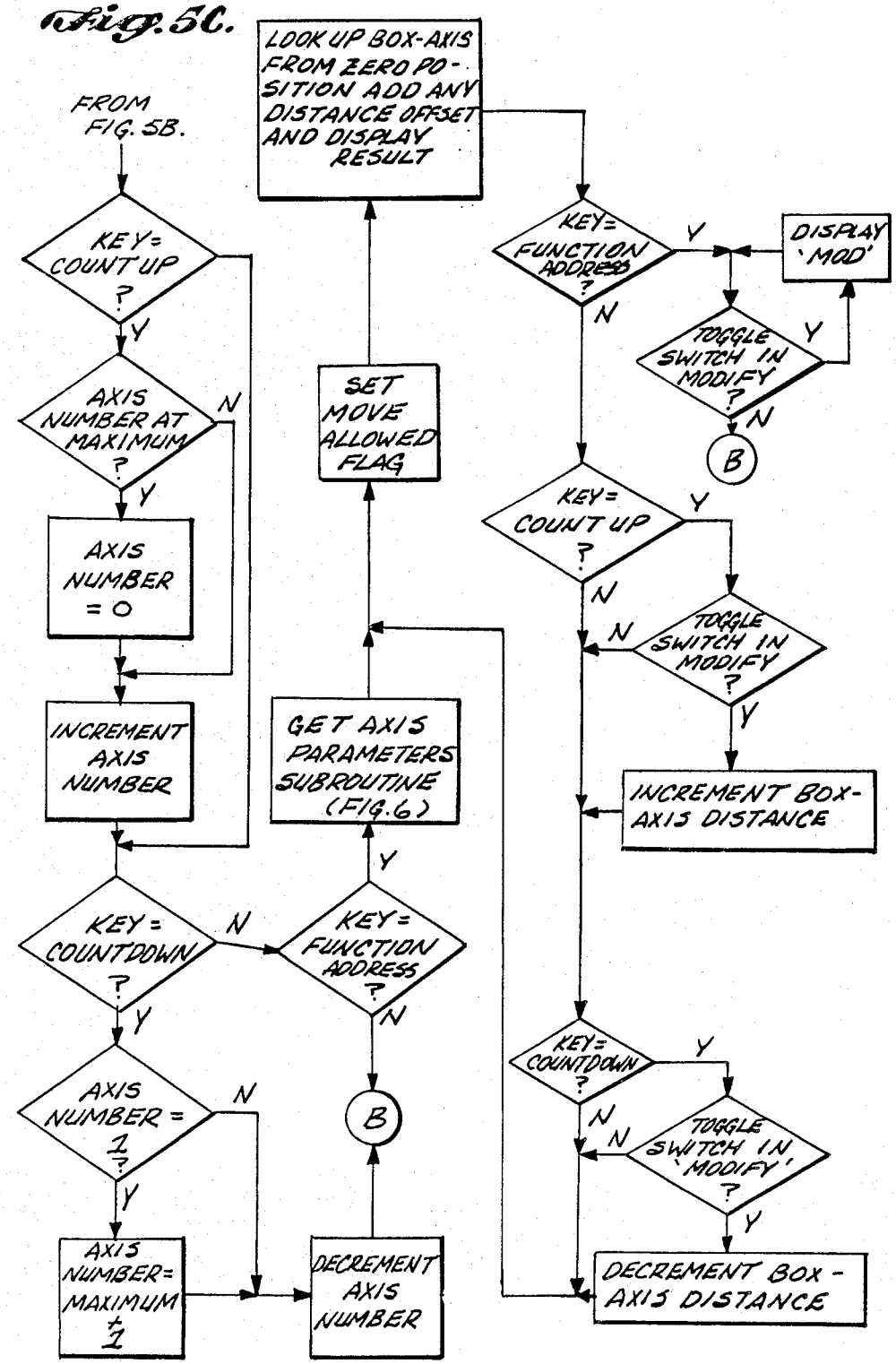

FROM FIG. 15C.

- DOWN-COUNTER = 250 (1" OF ENCODER COUNTS) SET MOTOR FLAG
- MOTOR SUBROUTINE (FIG. 10A&B)
- UPDATE SUBROUTINE (FIG. 11A-C)
- DOWN-COUNTER = 0 ?
  - N → (loop back to MOTOR SUBROUTINE)
  - Y → CLEAR MOTOR AND REVERSE FLAGS
- MOTOR SUBROUTINE (FIG. 10A&B)
- UPDATE SUBROUTINE (FIG. 11A-C)
- MOVING FLAG SET ?
  - Y → (loop back to CLEAR MOTOR AND REVERSE FLAGS)
  - N → GET AXES DIRECTION SUBROUTINE (FIG. 13) → D

COMPUTER ADJUSTABLE CASE HANDLING MACHINE

TECHNICAL AREA

This invention is directed to case handling machines and, more particularly, case handling machines controlled by a programmable controller.

BACKGROUND OF THE INVENTION

In the past, various types of amchines for cases, e.g., cardboard boxes, have been developed. Generally herein referred to as case handling machines, such machines include machines for assembling or erecting cases, machines for sealing cases and machines for placing inserts in cases, plus various combinations thereof. For example, some case handling machines both erect cases and, then, partially seal the erected cases. Other case handling machines merely seal cases. In some instances, sealing is accomplished using an adhesively coated tape. In other instances, an adhesive is applied directly to the major and/or minor flaps of the case to be sealed.

In the past, programmable controllers have been developed for controlling the operation of the case handling machines. See for example, U.S. Pat. Nos. 4,515,579; 4,516,210 and 4,545,175, all assigned to the assignee of the present application. While case handling machines including programmable controllers of the type described in these patents have a substantial advantage over semi-automatically controlled case handling machines, in the past, case handling machines controlled by such programmable controllers have had a significant disadvantage when utilized in environments requiring readjustment of the case handling machine from time to time in order to handle different sized cases.

More specifically, depending upon the machine, selected elements of case handling machines are designed to be movable so that one machine can handle various sized boxes. The movable elements may include, for example, the horizontally oriented rails and/or a head that supports various elements, such as flap positioning devices, glue heads, etc. In many machines, rails are moved inwardly and outwardly to adjust the machine to handle boxes of different widths and the head is raised and lowered to adjust the machine to handle boxes of different heights.

In the past, the movable elements of case handling machines have all been manually adjusted. That is, in order for the configuration of a case handling machine to be changed to handle a different size box, prior art machines have required the operator to manually readjust the movable elements of the machine. Readjustment usually entailed the rotation of handwheels connected to ball-screw mechanisms, the closure of switches connected to electric motors, etc. Obviously, the manual readjustment of a case handling machine is a time-consuming and, thus, undesirably expensive task, particularly when a case handling machine is part of a high-speed packaging line.

The present invention is directed to avoiding the foregoing disadvantage by providing a programmable controller for case handling machines that controls the position of the movable elements of the machine based on the size of the particular box or case to be handled. While the invention is described in connection with one type of case handling machine, it is to be understood that the programmable controller of the invention can be utilized with other types of case handling machines.

SUMMARY OF THE INVENTION

In accordance with this invention, a case handling machine including a programmable controller for controlling the position of the movable elements of the machine based on the size of cases to be handled is provided. The programmable controller includes a programmable central processing unit (CPU). The program that controls the CPU includes a routine that allows the operator to enter data that defines the position of each movable element for each size case to be handled by the machine. The position information for each movable element is stored based on a box number. Thereafter, when the box number is inputted by the operator, the programmable controller enters a routine that utilizes the stored information to automatically move the machine elements to their preprogrammed positions. Linear encoders in combination with counting keep track of the position of the movable elements as they move.

In accordance with other aspects of this invention, since all of the movable elements of a case handling machine move in a straight line, the position of the movable elements is defined as a poisiton along an "axis" of movements. The program that controls the CPU and, thus, the position of the machine elements includes a subroutine that determines if the normal sequence of axes movements is likely to create a conflict between the movable elements, when they are moved. If so, the sequence is rearranged so that the conflict is avoided.

In accordance with further aspects of this invention, the program that controls the CPU and, thus, the movement of the machine elements, includes a subroutine that detects jams, i.e., the inability of an element to move at the commanded speed. In the event of a jam, the power applied to cause element movement terminates and a jam display is created on the control-display unit (CDU) that provides an interface between the operator and the programmable CPU.

In accordance with still further aspects of this invention, the programmable controller uses low cost, relay/motor drive systems to control the movement of the movable elements and the program includes steps that provide compensation for relay contact closure and motor up-to-speed time delays.

In accordance with yet still further aspects of this invention, the program that controls the CPU includes a diagnostic routine that allows an operator to control the movement of the movable elements of the controlled case handling machine in a diagnostic manner.

As will be readily appreciated from the foregoing description, the invention provides a case handling machine that is readily and easily adjusted by an operator. Rather than manually rotating handwheels and the like, all an operator needs to do, after a CPU is programmed, is to insert a desired box number. Thereafter, the movable elements of the case handling machine are automatically moved to the correct position in a movement sequence that avoids conflict. If a jam occurs as a result, for example, of a movable element impinging on a foreign object, element movement ends and the operator is warned of the jam allowing the foreign object to be removed without harm to the case handling machine. The invention provides the foregoing benefits in an inexpensive manner by using low-cost relay controlled motor drive systems, rather than expensive systems, such as stepper motor systems, or expensive servo loops, for example.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIGS. 5A-C are flow diagrams of a modify box parameters subroutine suitable for use in the program illustrated in FIG. 4;

FIGS. 15A-D are flow diagrams of a move axis to program position subroutine suitable for use in the move to box position subroutine illustrated in FIG. 7;

DESCRIPTION OF THE PREFERRED EMBODIMENT

Figure 1:
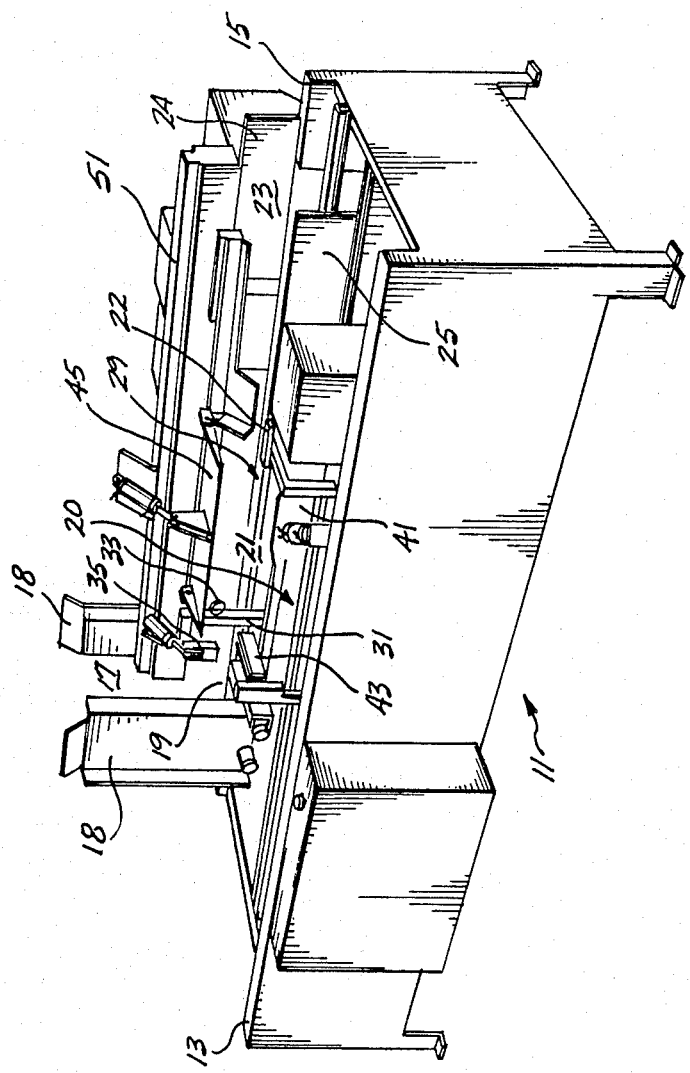
FIG. 1 is a pictorial diagram of a case set-up and bottom sealing machine.

FIG. 1 illustrates a case handling machine, specifically a case set-up and bottom sealing machine, controllable by a programmable controller formed in accordance with the invention. Because the mechanical mechanism of the case set-up and bottom sealing machine illustrated in FIG. 1 is known, the machine illustrated in FIG. 1 is not described in detail here. Rather, only the general layout of the major elements are described because such a description will make the overall nature and operation of the hereinafter described programmable controller more easily understood.

It is to be understood that the case set-up and bottom sealing machine illustrated in FIG. 1 is to be taken as an example of case handling machines of the type with which a programmable controller formed in accordance with the invention is useful. That is, it is to be understood that programmable controllers formed in accordance with the invention can be utilized to control other types of case handling machines, for example, case handling machines of the type described in U.S. Pat. Nos. 4,516,210 and 4,545,175.

The case set-up and bottom sealing machine illustrated in FIG. 1 includes a base 11 having a pair of parallel oriented sidewalls 13 and 15. The sidewalls 13 and 15 support various structural components (not shown in detail) that, in turn, support various mechanical mechanisms that move, set up and bottom seal a case, i.e., a cardboard box. A sequential diagram showing how a case is moved, set up and bottom sealed by a case set-up and bottom sealing machine of the type illustrated in FIG. 1 is contained in U.S. Pat. No. 4,515,579.

Located atop one end of the base is a hopper 17. The hopper houses a vertical stack of flattened (e.g., nonerected), horizontally oriented cases (not shown). The cases are removed one at a time from the bottom of the stack by a shuttle mechanism 19 located beneath the hopper. The hopper includes a vertical walls 18 that are movable toward and away from one another so that the hopper can be sized to match the cases to be erected. The walls may be adjusted by a mechanism of the type illustrated in FIG. 2 and described below. In any event, cases removed by the shuttle mechanism are received by a chain-driven flight bar mechanism 20 and moved first to a case set-up station 21.

As each case reaches the case set-up station 21, the chain-driven flight bar mechanism is stopped and the case is erected. After being erected, while still at the case set-up station, the upper bottom major flap of the case is raised, adn the bottom minor flaps of the case (which are located along the now vertical leading and trailing edges of the case) are folded inwardly. After the minor flaps have been folded inwardly, the upper bottom major flap is folded down. Thereafter, the case is moved from the case set-up station 21, past a glue head 22, to a mandrel station 23 by the chain-driven flight bar mechanism 20. When the case reaches the mandrel station 23, the chain-driven flight bar mechanism is again stopped. Thereafter, a mandrel 24 moves into the case and presses the bottom minor and major flaps together and against a stop 25. The pressure seals the major flaps to the minor flaps.

As each case approaches the case set-up station 21, a case stop 29 is raised to halt movement of the case. At the same time, as noted above, the chain-driven flight bar mechanism 20 is halted. The case stop 29 is included to precisely position the case and avoid any error caused by case inertial movement after the power applied to the chain-driven flight bar mechanism temporarily ends. After the case stops, a bottom vacuum cup is raised and grips the bottom of the flattened case. The "bottom" is gripped in the area of the downstream one of the case sides forming part of the "bottom" of the flattened case. Next, a case erect arm 31 located above the downstream one of the flattened case rotates from a vertical position into a horizontal position, bringing a top vacuum cup 33 mounted on the outer end of the case erect arm 31 into contact with the "top" of the flattened case. The contact point is located on the downstream one of the two sides of the case forming part of the "top" of the flattened case. After the top vacuum cup 33 grips the case, the case erect arm 31 is rotated from its horizontal positn back to the vertical position illustrated in FIG. 1. As the case erect arm 31 rotates in this manner, the case is erected.

After being erected, a lifter 35 is actuated to raise (or maintain raised) the upper bottom major flap of the erected case. Thereafter, leading and trailing minor flap folders 41 and 43 are actuated to fold inwardly the leading and trailing flaps of the erected case. Next, a major flap folder 45 is actuated to fold the upper bottom flaps down. Then, the folding force created by the bottom and top vacuum cups 30 and 33 is released and the erected case is moved toward the glue head 22. As the case is moved, the lower bottom major flap is folded up. When the case reaches the glue head 22, which passes through the slit between the edges of the upper and lower bottom major flaps, glue is applied to the flaps. As noted above, after passing the glue head 22, the case is moved to the mandrel station 23 whereat, as previously described, a mandrel 24 moves into the case and presses the bottom major and minor flaps against the stop 25. After a predetermined compression time period has elapsed, the mandrel is withdrawn and the case is moved out of the mandrel station 23.

Several of the elements used to process a case in the manner heretofore described, namely, the lifter 35 and the major flap folder 45, are attached to a head 51 that is raisable and lowerable to accommodate different sized boxes. Other elements, such as the leading and trailing minor flap folders 41 and 43 and the stop 25 are mounted on supports that allow these elements to be horizontally moved toward and away from the box path of travel to compensate for different box sizes. In addition, rails associated with the flight bar mechanism 20 may be movable toward and away from the box path of travel to accommodate different sized cases. In the past, these movable elements as well as the walls 18 of the hopper 17 have been manually adjusted by an operator each time it was necessary to reposition the elements to accommodate a different sized box. In some machines, manual adjustment is accomplished by rotating a handwheel or some other mechanical device. In some instances, closure of a switch to actuate a motor connected to the screw of a ball-screw mechanism is utilized to manually control the position of the movable elements. The major disadvantage of manually adjusting a case handling machine each time a new box is to be processed is the time delay and resultant costs associated with such adjustment. The invention overcomes this disadvantage by providing a programmable controller designed to control the position of the movable elements of a case handling machine.

Figure 2:
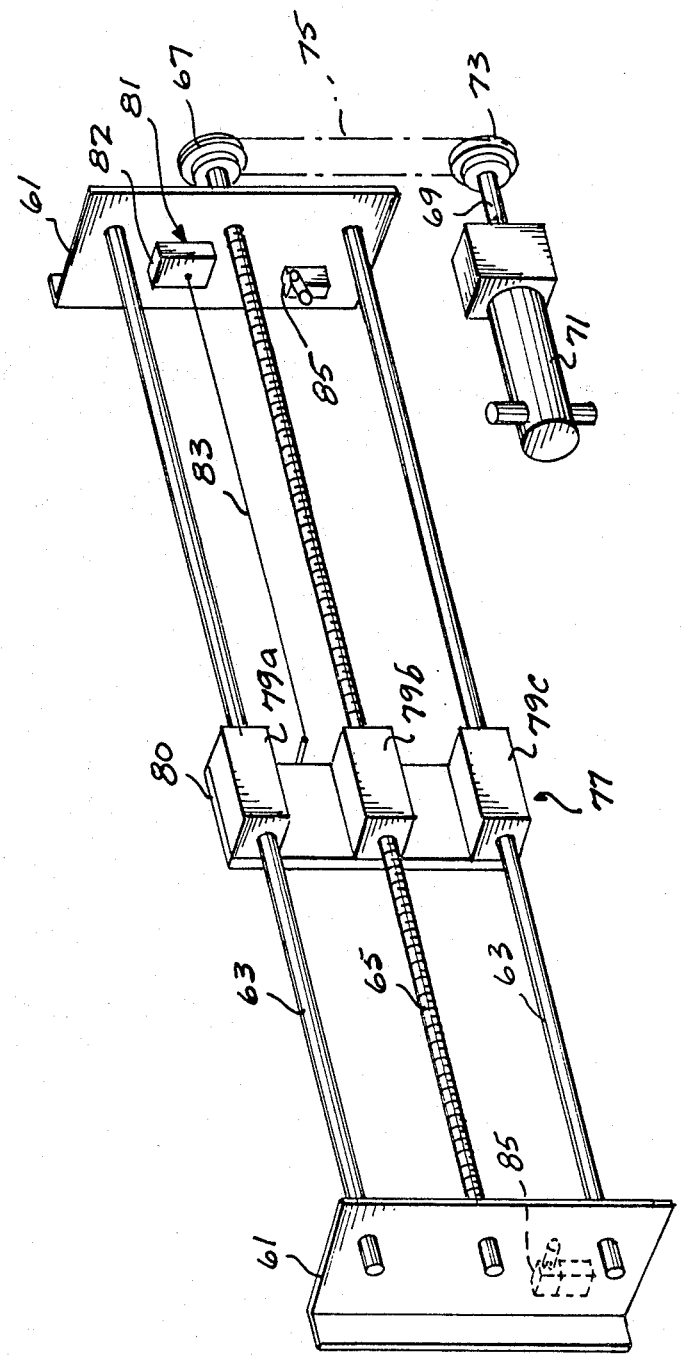
FIG. 2 is an exemplary, pictorial view of a motor driven positioning mechanism suitable for use in a case handling machine to move on or more of the movable elements of the machine.

FIG. 2 is a pictorial diagram of an example of an element positioning mechanism suitable for use in a case handling machine controlled by a programmable controller formed in accordance with the invention. More specifically, FIG. 2 illustrates a pair of spaced apart angle brackets 61 suitable for attachment to the sidewalls 11 and 13 of a case handling machine such as the case set-up and bottom sealing machine illustrated in FIG. 1. Located at opposite ends of facing legs of the angle brackets 61 and extending therebetween are a pair of cylindrical guide rods 63. Also extending between the facing legs of the brackets 61, between the guide rods 63, is a long threaded shaft 65 that forms the screw of a ball-screw mechanism. The ends of the threaded shaft 65 are journaled into the facing legs of the bracket 61. Mounted on an outwardly extending end of the threaded shaft 65 is a pulley 67. Mounted on the end of the shaft 69 of a bidirectional drive motor 71 is a second pulley 73. The first and second pulleys 67 and 73 are coupled together by a belt 75. Preferably, the belt and the pulleys 67 and 73 contain interlocking teeth.

Mounted on the guide rods 63 and the threaded shaft 65 is a mounting assembly 77. More specifically, the mounting assembly 77 includes three blocks 79a, 79b and 79c, joined by a plate 80. The guide rods 63 slidably pass through two of the blocks 79a and 79c. The threaded shaft 65 passes through a threaded hole in the third block 79b, which forms the ball part of the ball-screw mechanism. As a result, when the threaded shaft 65 is rotated, the mounting assembly 77 moves in one direction or the other along the longitudinal axis of the threaded shaft 65. The direction of movement is determined by the direction of rotation of the threaded shaft 65.

Mounted on one of the brackets 61 is the body 82 of a linear encoder 81 connected to the mounting assembly 77. As the mounting assembly 77 is moved back and forth when the threaded shaft 65 is rotated, the wire 83 of the linear encoder 81 extends and retracts. The amount of wire extension denotes the position of the mounting assembly 77. With respect to the bracket 61 on which the linear encoder body 82 is mounted, a linear encoder of the type illustrated in FIG. 2 and described above is available from Celesco Transducer Products, Inc., Conoga Park, Calif.

Also mounted on one of the brackets 61 is a home switch 85. The home switch 85 is a limit switch positioned to be arcuated, i.e., closed or opened, when impinged on by the mounting assembly 77. This is known as the "home" position of the mounting assembly 77 and, thus, any elements attached to the mounting assembly. More specifically, in accordance with this invention, positioning mechanisms of the type illustrated in FIG. 2 (or other types of positioning mechanisms designed to accomplish a similar result) are used in a case handling machine by affixing an element to be moved or adjusted to the mounting assembly 77 and orienting the positioning mechanism such that desired axis of movement of the movable or adjustable element lies parallel to the guide rods 63 and the threaded shaft 65. Thereafter energization of the drive motor moves the mounting assembly and, thus, the adjustable element between desired positions. Since the linear encoder output denotes the direction and amount of movement of the mounting assembly, the linear encoder output denotes the direction and amount of movement of the adjustable element. Actuation of the home switch denotes when the mounting assembly and, thus, the adjustable element is at a particular position denoted the home position.

While FIG. 2 illustrates a single mounting assembly mounted on the guide rods 63 and the threaded shaft 65, it is to be understood that two mounting assemblies designed to move in opposite directions could be mounted on the guide rods 63 and the threaded shaft 65, if desired. In such an arrangement, movement in opposite directions is controlled by having one-half of the threaded shaft 65 threaded in one direction and the other half threaded in the opposite direction with the block 79b of the two mounting assemblies threaded in a corresponding manner. Such a dual mounting assembly arrangement might be used, for example, to control the position of the walls 18 of the hopper 17 illustrated in FIG. 1. Further, if desired, such an arrangement could include a home switch 85 mounted on each of the brackets 61 for sensing when each mounting assembly is at its home position.

Figure 3:
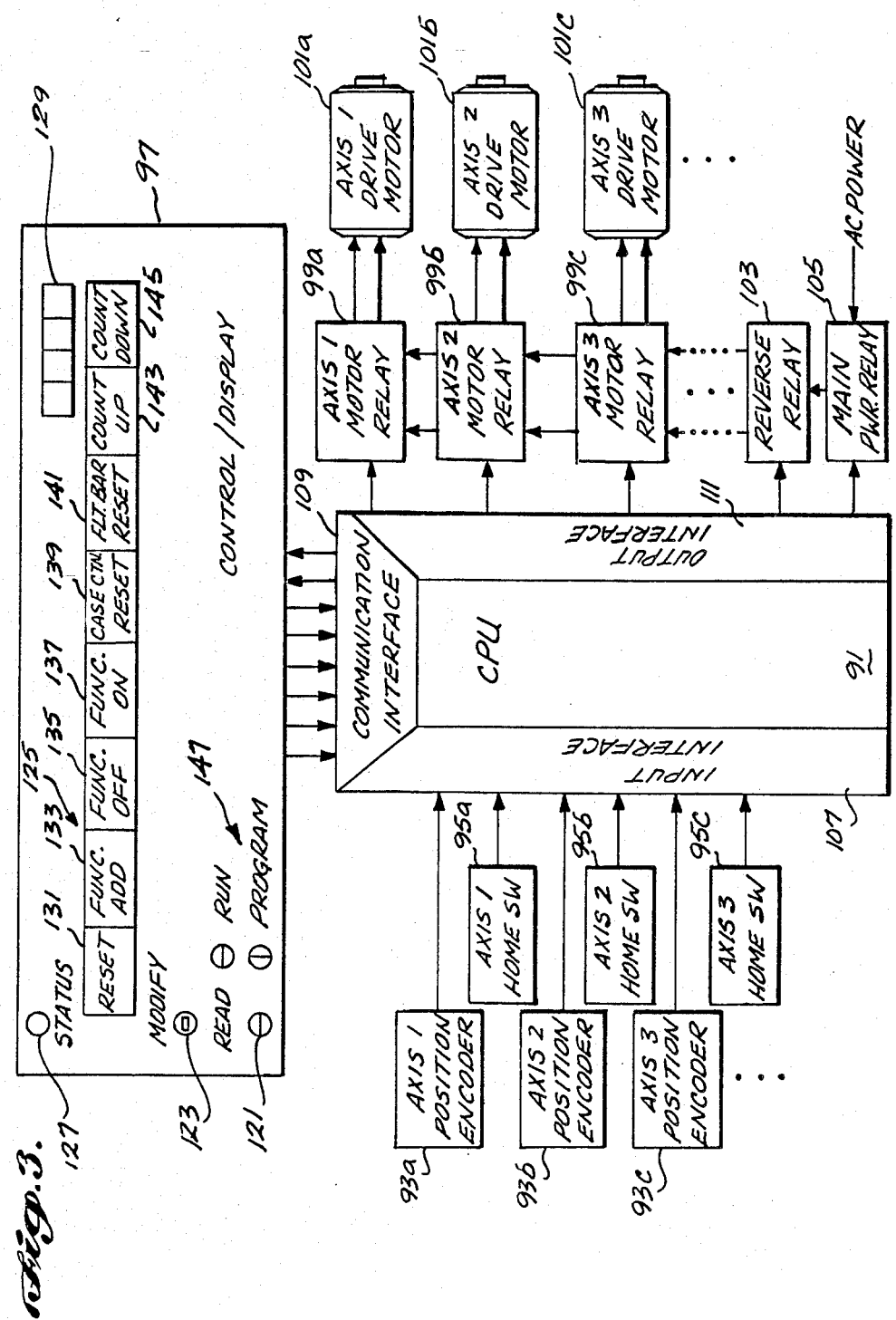
FIG. 3 is a block diagram illustrating a controller formed in accordance with the invention for controlling a case handling machine.

FIG. 3 is a block diagram of a programmable controller formed in accordance with the invention for controlling a case handling machine of the type illustrated in FIG. 1. The programmable controller illustrated in FIG. 3 comprises: a central processing unit (CPU) 91 that includes an adequate amount of temporary (e.g., RAM) and permanent (e.g., ROM) memory necessary to accomplish the hereinafter described functions; a plurality of axis position encoders 93a, 93b, 93c, etc.; a plurality of axis home switches 95a, 95b, 95c, etc.; a control-display unit (CDU) 97; a plurality of axis motor relays 99a, 99b, 99c, etc.; a plurality of axis drive motors 101a, 101b, 101c, etc.; a reverse relay 103; and, a main power relay 105. The CPU 91 is connected to the axis position encoders 93a, 93b, 93c, etc., and the axis home switches 95a, 95b, 95c, etc. via an input interface 107. The CPU 91 is connected to the CDU 97 via a communications interface 109. Further, the CPU is connected to the motor relays 99a, 99b and 99c, the reverse relay 103 and the main power relay 105 via an output interface 111. The axis drive motors 101a, 101b, 101c, etc. are connected to related axis motor relays 99a, 99b, 99c, etc. A DC power input is connected to the power contacts of the axis motor relays via the power contacts of the reverse and main power relays connected in series.

The CDU 97 provides an operator interface to the CPU 91 via the communications interface 109. The CDU includes: a run-program switch 121; a read-modify switch 123; a plurality of program keys 125; a status light 127; and, an alphanumeric display 129. The program keys 125 include: a reset key 131; a function-/address key 133; a function off key 135; a function on key 137; a case count reset key 119; a flight bar reset key 141; a count-up key 143; and, a countdown key 145. The run-program switch 121 is, preferbly, a two-position key operated switch--the two positions are denoted the run position and the program position. When in the read position, the run-program switch 121 places the case handling machine in a run mode of operation. When in the program position, the run-program switch places the machine in a program mode of operation. Preferably, a run-program switch display 147 is provided to show the key positions for the two modes of operation. The use of a key switch has the advantage of preventing unauthorized or inadvertent reprogramming of the CPU. Preferably, the read-modify switch 123 is a two-position toggle switch that can be placed in either a read or a modify position. When in the modify position, the position data stored by the CPU for controlling the position of the movable elements can be changed. When in the read position the position data cannot be changed. Preferably, the program keys 125 are momentary contact switches of the type utilized in a wide variety of electronic devices, such as calculators, keyboards, etc. The status light 127 is, preferably, a light-emitting diode covered with a suitable colored (e.g., red) lens. Preferably, the alphanumeric display 129 is a four (4) character display suitable for displaying either letters or numbers, as required. As will be better understood from the following description, the names given to the program keys are not always descriptive of the function to be performed. There are two reasons for this. First, some keys perform different functions in different subroutines. Second, the program keys are also used to program the operation of the case handling machine as well as the position of the adjustable elements of the machine. See U.S. Pat. No. 4,515,579.

As will be appreciated from the foregoing description, the programmable controller illustrated in block form in FIG. 3 includes sensing devices for sensing the axial position of each movable element and a home switch for sensing when the movable element is in its home position. The information produced by the sensing devices, in combination with the way the CPU 91 is programmed by an operator via the CDU 97, controls the position of the adjustable elements. In essence, as will be better understood from the following description, the way the CPU is programmed and the data derived from reading the position sensing devices, e.g., the axis position encoders and the axis home switches, controls the position of the adjustable elements when the operator inserts a box number via the CDU. Once the adjustable elements are positioned, the function of the programmable controller ends and the case handling machine functions in the manner it was designed to function. In the case of a programmable set-up and bottom sealing machine of the type illustrated in FIG. 1, cases are moved from the hopper and assembled in the manner outlined above.

Figure 4:
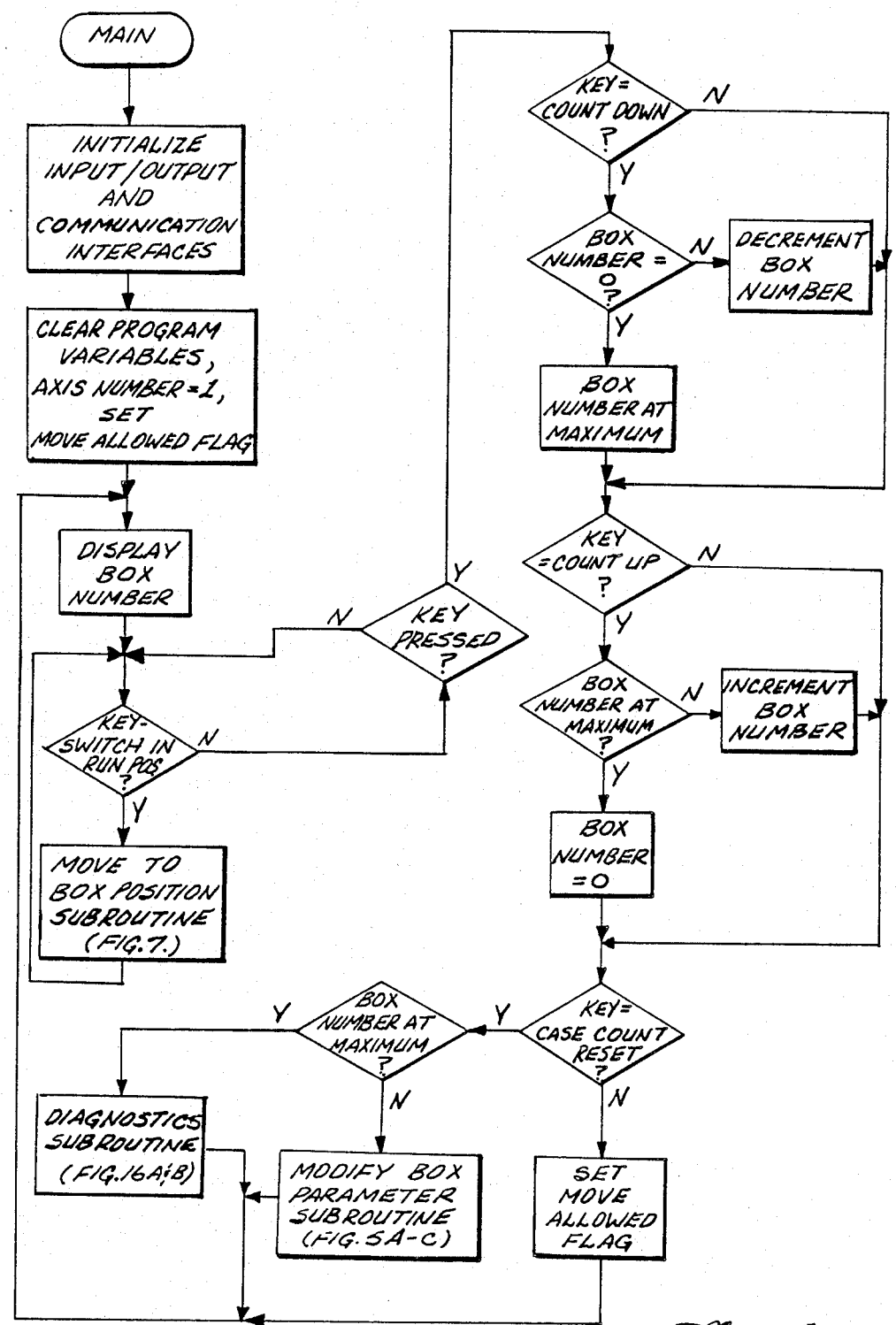
FIG. 4 is a flow diagram illustrating the main program (i.e., the main sequence of operation) of the central processing unit (CPU) illustrated in FIG. 3.
Figure 6A:
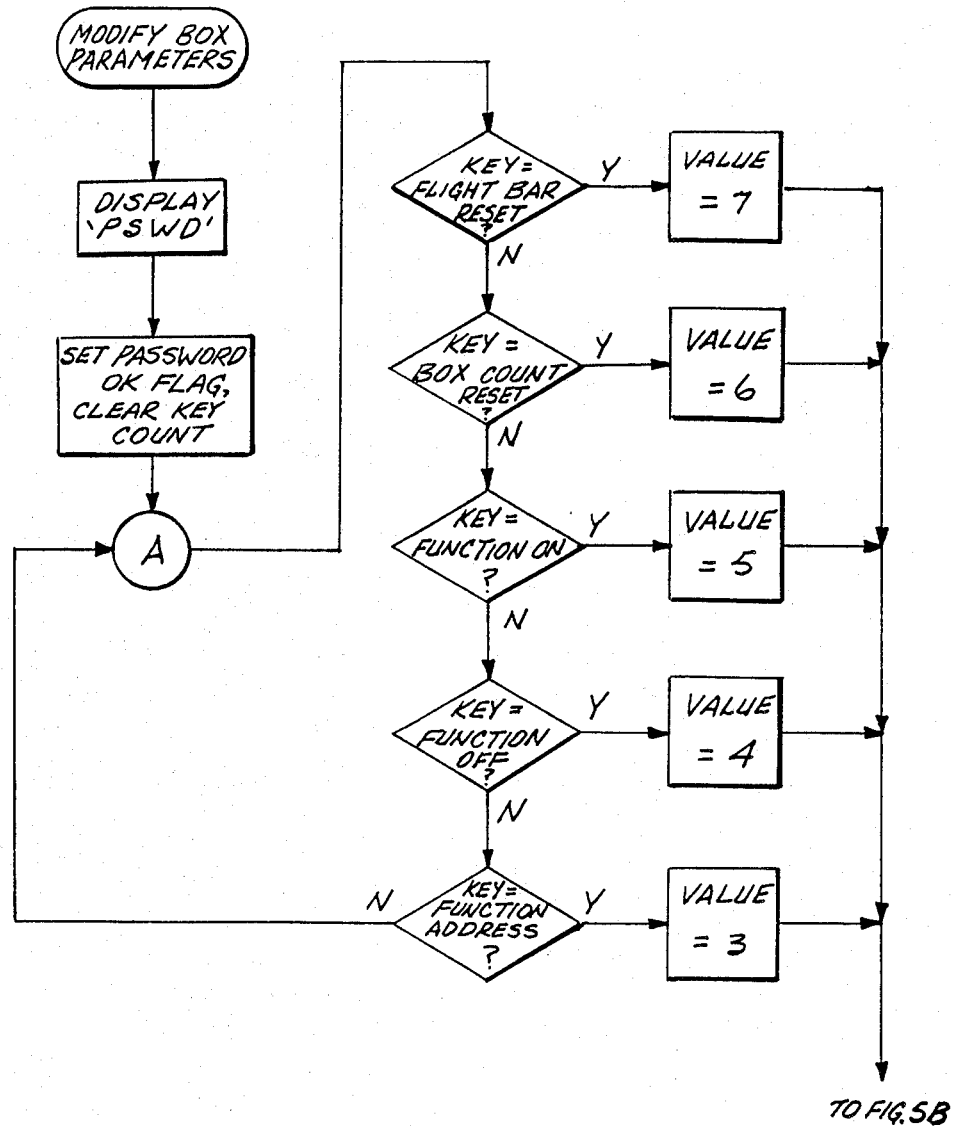
FIG. 6 is a flow diagram of a get axis parameters subroutine suitable for use in the modify box parameters subroutine illustrated in FIGS. 5A-C and in various other subroutines.

FIG. 4 is a flow diagram illustrating the main program suitable for controlling the CPU 91 of a computer adjustable case handling machine formed in accordance with the invention. When power is first applied to the CPU or a power reset control switch (not shown) is actuated, the main program illustrated in FIG. 4 is entered. The first step of the main program is to: initialize the input, output and communication interfaces 197, 109, and 111; clear all program variables; set an axis number counter equal to one; and, set a control flag, denoted the move allowed flag.

After the CPU is initialized, a box number is displayed. When the machine is first turned on, this display defaults to a zero/zero value. Next, the program tests the position of the key switch 121 to determine if it is in the run or program position. If the key switch 121 is not in the run position, i.e., the key switch is in the program position, the program keys 125 are read to determine if any are pressed. If no program keys are being pressed, the program cycles to the key switch in run position test. The program remains in this loop until a program key is pressed or the program switch is changed to the run position.

When a program key is pressed, a test is made to determine if the countdown key 145 is the one being pressed. If the countdown key is being pressed, a test was made to determine if the displayed box number is equal to zero. If the displayed box number is equal to zero, a box number stored in memory (which controls the box number display) is set to a maximum value—ninety-nine (99), for example. If the box number is not equal to zero, the box number stored in memory is descremented. If the countdown key was not being pressed, or after the box number is decremented or set to its maximum value, depending upon the path followed, a test is made to determine if the count-up key 143 is the one being pressed. If the count-up key 143 is the one being pressed, a test is made to determine if the box number stored in memory is at its maximum value. If it is at its maximum value, the box number is set equal to zero. If the box number is not at its maximum value, the box number value is incremented. If the key was not the count-up key 143, or after the box number has been incremented or set equal to zero, depending upon the path followed, a test is made to determine if the key being pressed is the case count reset key 139. If the key is not the case count reset key 139, the move allowed flag is set and the program cycles to the display box number step. If the key being pressed is the case count reset key, a test is made to determine if the box number is at its maximum value. If the box is not at its maximum value, the program cycles to a modify box parameter subroutine illustrated in FIGS. 5A–C and described below. If the box number is at the maximum value, the program cycles to a diagnostic subroutine illustrated in FIGS. 16A and 16B and described below. After the program passes through either the modify box parameter or the diagnostics subroutine, depending upon the path being followed, the main program cycles to the display box number step.

If the key switch is in the run position when it is tested, rather than testing the program keys 125 in the manner heretofore described, the main program cycles to a move to box position subroutine illustrated in FIG. 7 and described below. After passing through the move to box position subroutine, the program cycles back to the key switch run position test.

As will be readily appreciated from the foregoing description of the main program illustrated in FIG. 4, whether the key switch is in the run or program positions determines whether the program cycles through a programming subroutine (the modified box parameter subroutine) or a diagnostics subroutine, or through a subroutine that controls the movement of the adjustable elements to programmed positions determined by the displayed box number. Since the way the program controls movement of the adjustable elements of the controlled case handling machine to their programmed position will be best understood if the way the program controls the programming of the CPU is first understood, the way the CPU is programmed is first described.

Figure 5B:
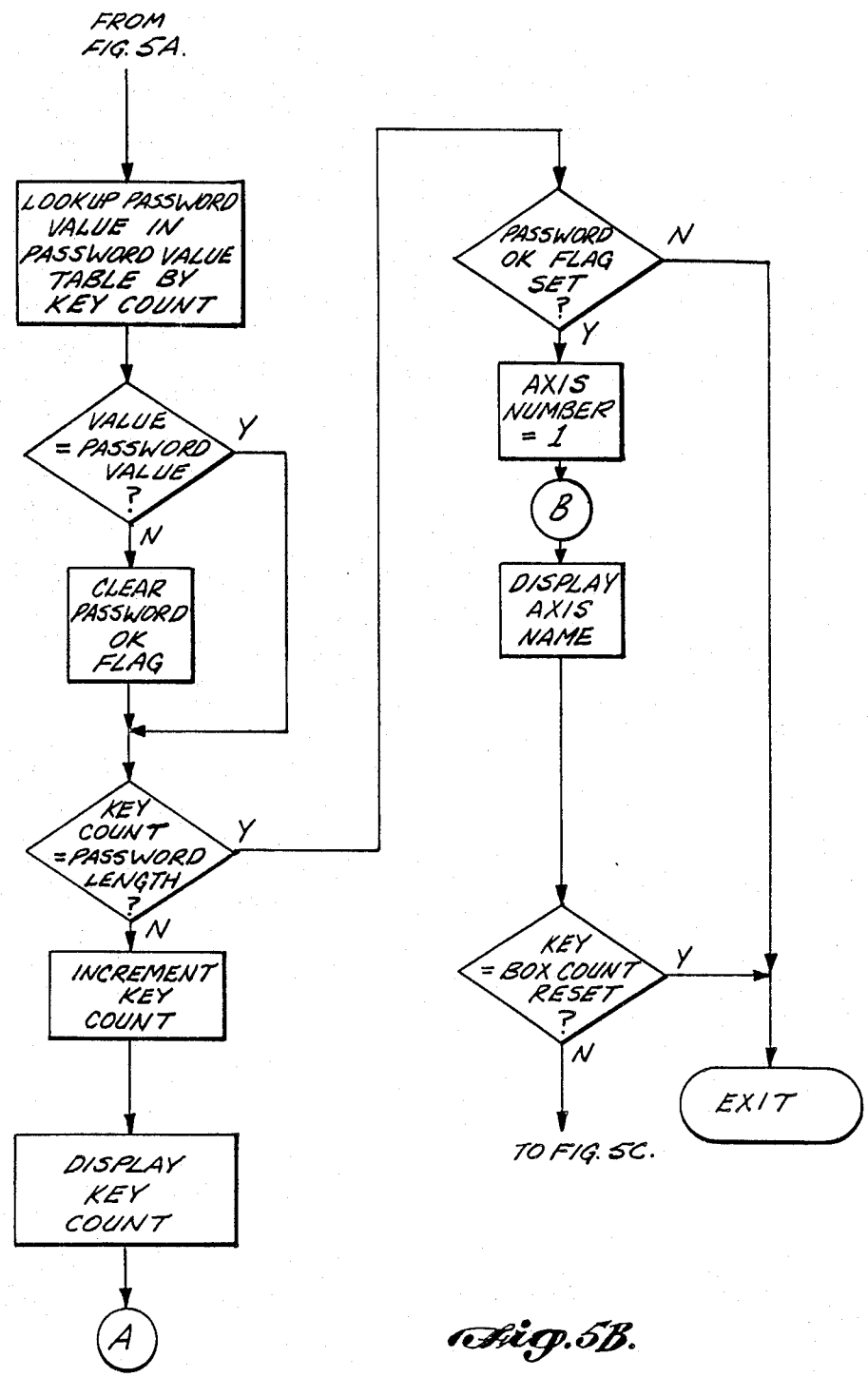

The CPU is programmed by the modify box parameters subroutine illustrated in FIGS. 5A–C. As will be better understood from the following description of the modify box parameters subroutine, the subroutine first requires that the operator insert a predetermined password, in the form of a sequence of digits. If the correct sequence is not inserted, the operator cannot access the remainder of the modify box parameters subroutine and, thus, cannot program the CPU. If the correct sequence is entered, the operator is allowed to program the CPU. Obviously, if this level of security is not required or desired, the password portion of the modify box parameters subroutine can be delted.

As illustrated in FIG. 5A, the first step in the password portion of the modify box parameters subroutine is to display the letters PSWD, to denote password. Thereafter, a password OK flag is set and a key counter that keeps track of the number of programming keys pressed is cleared. Then, a sequence of tests is made to determine which one, if any, of five program keys is pressed. These keys are: the flight bar reset key 141; the box count reset key 131; the function on key 137; the function off key 135; and, the function address key 133. The modify box parameters routine continues to cycle through the sequence of programming key tests until one of these five keys is pressed. When one of the keys is pressed, a particular numeric value related to the key pressed is stored. In the illustrated embodiment of the invention, the numerical value related to the flight bar reset key is 7, the numerical value related to the box count reset key is 6, the numerical value related to the function on key is 5, the numerical value related to the function off key is 4, and the numerical value related to the function address key is 3. Obviously, any values usable by the CPU can be used instead of the denoted values.

After one of the five keys is pressed, the value related to the pressed key is then looked up in a password value table based on key count. More specifically, the key count counter that was cleared when the password sequence was entered acts as a pointer that points to a particular data position in the password value table. When the counter is cleared, it looks at the first position in the password value table. Each time the counter is thereafter incremented, it looks at the next position in the password value table. Preferably, the password value table is not part of the volatile memory of the CPU and the password values are not inserted via the CDU. Rather, preferably, the password value table is part of a nonvolatile memory, such as an EPROM programmed using an EPROM programmer.

After the password value in the position being pointed to by the key counter is looked up, it is compared with the value inserted by the operator. If the values are different, the password OK flag is cleared. If the value is correct, or after the password OK flag is cleared, the modified box parameters routine tests the key count counter to determine if the key counter value is equal to the password length. If the key counter value is not equal to the password length, the key counter is incremented and the incremented value is displayed. Thereafter, the modified box parameters subroutine cycles back to the point where five program keys are tested (point A, FIG. 5A).

The program cycles through the foregoing paths until the key count counter value equals the password length. Then, the modified box parameters subroutine tests the password OK flag to determine if it is set. The password OK flag is not set if one or more of the values chosen by the operator using the five program keys was not the same as a related password value. Which value is incorrect is not made known to the operator because a choice is required for all values before the password OK flag is tested. If the password OK flag is not set, the modified box parameters subroutine terminates and the program returns to the main sequence (FIG. 4) at the point where the key switch in run position test takes place. When this path is followed, the operator is prevented from modifying any of the box axes positions, i.e., the operator is prevented from modifying any of the box parameters.

If the password "OK" flag is set, an axis number counter is set equal to one. Each axis number, of course, relates to a controllable axis of the case handling machine. After the axis number is set, the related axis name is displayed. Then, the program keys are tested to determine if any are being pressed. Pressing teh box count reset key indicates that the operator is finished setting the axis parameters for a particular box. When this occurs, the program cycles to the main sequence (FIG. 4) at the point where the box number is displayed. If the count up key is being pressed, a test is made to determine if the current axis number is the maximum axis number. If the current axis number is the maximum axis number, the axis number is set equal to zero. If the current axis number is not the maximum axis number, or after the axis number has been set equal to zero, the axis number is incremented. If the count up key is not being pressed, or after the axis number has been incremented, a test is made to determine if the count down key is being pressed. If the count down key is being pressed, a test is made to determine if the current axis number is equal to one. If the current axis number is equal to one, the axis number is set equal to the maximum axis value plus one. After the axis number is set equal to the maximum axis value plus one, or if the axis number was not equal to one, the axis number is decremented. Thereafter, the modify box parameters subroutine cycles to the point where the axis name is displayed—point B in FIG. 5B. If the count down key is not being pressed, a test is made to determine if the function address key is being pressed. If the function address key is not being pressed, the modify box parameters subroutine also cycles to the point where the axis name is displayed. In summary, if the box count reset key is pressed, the modify box parameters routine terminates. If the count up key is pressed, the current axis number value is incremented. If the count down key is pressed, the current axis number is decremented. The incremented or decremented axis name is then displayed.

Figure 6:
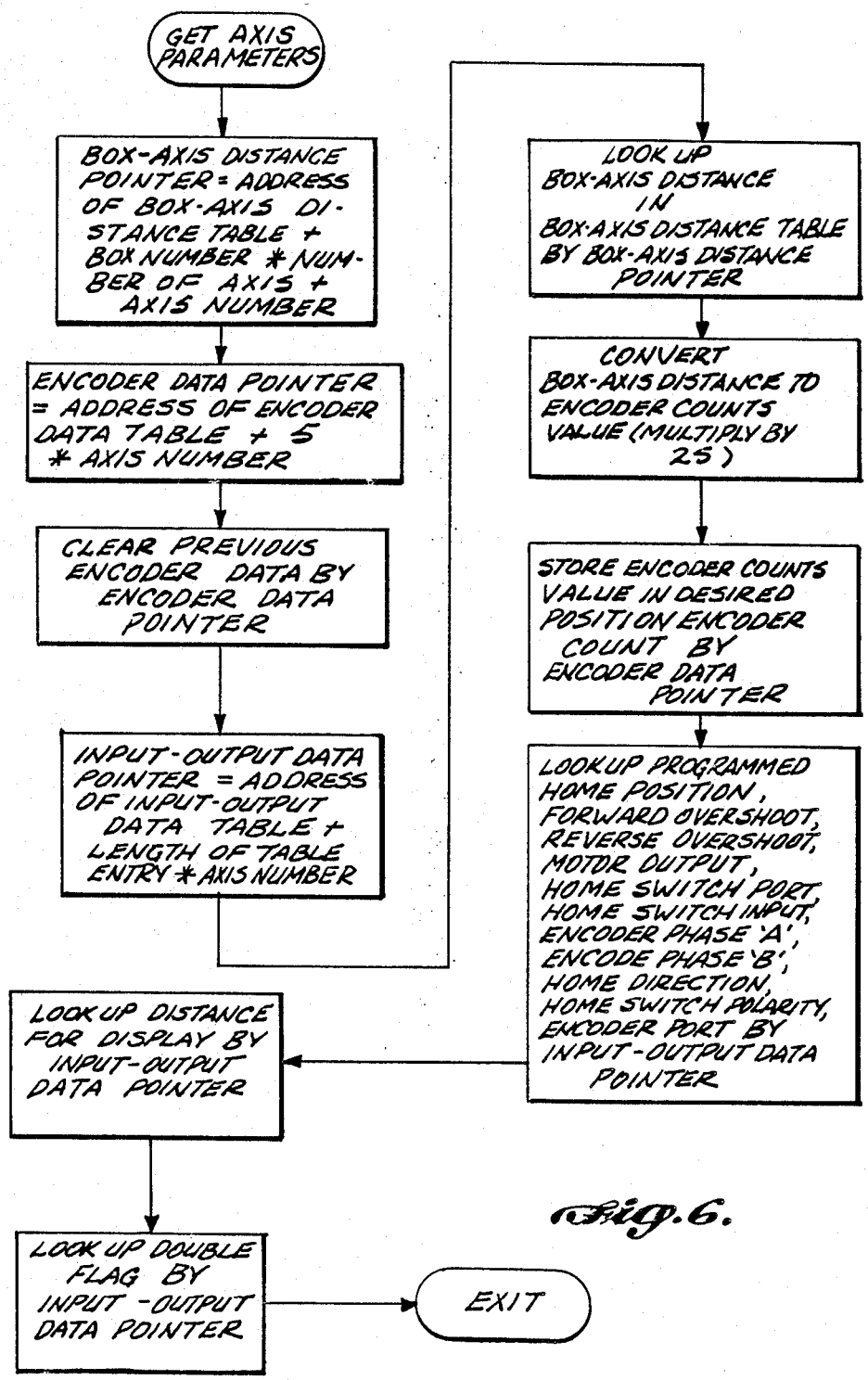

If the function address key is pressed, axis parameters related to the axis being displayed are transferred to a scratch pad memory location, i.e., a memory location where the transferred values can be more easily changed. The transfer sequence is referred to as the "get axis parameters subroutine" and is illustrated in FIG. 6. Because understanding the get axis parameters subroutine will help in understanding the remainder of the modify box parameters subroutine, the get axis parameters subroutine is next described. Prior to the description, it is printed out that because the get axis parameters subroutine is a universal subroutine, not all of the subroutines that include the get axis parameters subroutine use all of the transferred data.

As noted above, the get axis parameters subroutine transfers data, specifically data related to a particular axis, into a scratch pad or operating memory. In order to transfer the axis data, it is first necessary to create pointers that point to the memory location that contains the data to be transferred. The get axis parameters subroutine creates three pointers--a box-axis distance pointer, an encoder data pointer and an input-output data pointer.

The first step in the get axis parameters subroutine is to create the box-axis distance pointer. The box-axis distance pointer is created by adding to the address of the box-axis distance table a number that is determined by multiplying the box number by the number of axes and then adding to the resultant value the axis number created in the manner previously described. For example, if the case handling machine has six axes, the box-axis distance table will include six sequential numbers for each box; the first number related to the first axis, the second number related to the second axis, etc. If the current box number is 12, and the current axis number is 5, the number to be added to the box-axis distance table address will be 77[(12×6) plus 5.]

After the box-axis distance pointer is created, the encoder data pointer is created. The encoder data pointer is created by multiplying the box axis number by 5 and adding this value to the address of the encoder data table. While the box-axis distance table includes a value for each axis of each box number, the encoder data table is a common table that only stores encoder data related to the current axis, i.e., the axis being used to move a movable element of the case handling machine to a programmed position. The box axis number is multiplied by 5 because five pieces of data are stored in a serial manner in the encoder data table for each axis.

After the encoded data pointer is created, the previous encoder data is cleared from the encoder data table. Thereafter, the input-output data pointer is created. The input-output data pointer is created by multiplying the length of the table entry by the axis number and adding the result to the address of the input-output data table. Like the encoder data, input-output data includes a number of pieces of data. The number of data pieces which are stored serially in the input-output data table determine the length of the table entries. The nature of the pieces of data is described below. Like the encoder data table, the input-output data table is a common table that only stores input-output data related to the current axis.

After the input-output data pointer is created, the box-axis distance stored in the box-axis distance table is looked up based on the value of the box-axis distance pointer and transferred to the scratch pad memory. If the axis has not been previously programmed, the box-axis distance value transferred is undefined. Since box axis distance is stored in units of distance, e.g., inches, and since the position encoders produce pulses at a rate of so many pulses per inch—25 pulses per inch, for example—it is necessary to convert the box axis distance value to an encoder count value. This step is accomplished next in the get axis parameter subroutine by multiplying the box-axis distance value by the encoder pulse per distance value (25). The result is stored as an encoder count value in the encoder data table. The position in the encoder data table is based on the value of the encoder data pointer.

Next, the values previously entered into in a permanent memory, such as an erasable programmable read only memory (EPROM), are looked up based on the value of the input-output data ponter. The values looked up include the programmed home position of the movable element along the axis used to set the input-output data printer, i.e., the encoder value when the movable element is in its home position. The looked-up values also include the forward and reverse overshoot values for the drive motor used to move the movable element along the axis used to set the input-output data pointer. More specifically, each drive motor is tested to determine the amount of overshoot that occurs in the forward and reverse direction when energy to the motor is terminated. These values are stored in the permanent memory. More specifically, the overshoot values, in terms of encoder counts, are stored in the permanent memory.

Other information stored in the permanent memory include the motor output port, the home switch port, the home switch input actuation status (high or low), the encoder phase A and phase B values (described more fully below), the direction of movement to reach the home position, the home position, the home switch polarity value and the encoder port value for the axis used to set the input-output data pointer.

Additional values unique to particular case handling machines are also looked up, such as distance offset for a display and double flags. Distance offsets are useful when it is desirable to create an axis configuration that appears correct to an observing operator but is mathematically incorrect from a machine control point of view. Double values are useful when two elements are moved by the same drive motor to avoid the need to perform a distance calculation twice.

As noted above, because the get axis parameters subroutine is universal, i.e., used in a variety of higher level subroutines, all of the parameters transferred to the scratch pad memory are not always used in the higher level subroutines. AS a matter of fact, as next described, the modify box parameters subroutine only uses the box-axis distance value. More specifically, as shown in FIG. 5C, after making a pass through the get axis parameters subroutine, the modify box parameters subroutine sets the move allowed flag. Then, the modify box parameters subroutine looks up the box axis distance from the zero position stored in the scratch pad memory, adds any offset and displays the result. The end result is a display of the programmed position of the movable element along the current axis of movement. Preferably, the display is in inches and tenths of inches.

After the currently programmed position display has been created, the keys are tested to determine if any are being pressed. If the function address key is being pressed, a test is made to determine if the read-modify switch 123 is in the modify or read position. If the toggle switch is in the modify position, the word "MOD" is displayed, and the modify box parameters routine cycles back to the read-modify switch test. This loop is repeated until the read-modify switch is switched to the read position. When this occurs, the modify box parameters subroutine cycles to the display axis name step (FIG. 5B). In essence, when the function address key is pressed and the read-modify switch is in the read position, the ability of the operator to change the programmed position of the movable element along current axis ends and the modify box parameters subroutine returns to the point where the axis number can be changed so that the position of the movable element along another axis can be changed.

If the function address key is not being pressed, a test is made to determine if the count up key is being pressed. If the count up key is being pressed, a test is made to determine if the read-modify switch 123 is in the modify or read position. If the read-modify switch is in the modify position, the box axis distance value is incremented by an increment/decrement value—one-tenth of an inch, for example. If the count up key is not being pressed, the readmodify switch is not in the modify position or after the box-axis distance value has been incremented, a test is made to determine if the count down key is being pressed. If the count down key is being pressed, a test is made to determine if the read-modify switch 123 is in the read or modify position. If the read-modify switch is in the modify position, the box-axis distance value is decremented by the increment/decrement value. If the count down key is not being pressed, the read-modify switch is not in the modified position, or after the box-axis distance value has been decremented, the modify box parameters subroutine cycles to the point where the move allowed flag is set. Thereafter, the new box axis distance value (plus any offset) is displayed.

The reason for testing the read-modify switch after the count up and count down key tests is to make certain that the operator intends that the displayed box-axis distance value be modified. As shown in FIG. 5C and described above, if the read modify switch is in the read position, the box-axis distance value cannot be incremented or decremented. When the read-modify switch is in the modify position, the box-axis distance value can be incremented or decremented. In essence, the read-modify switch forms a safety feature that requires an operator to reaffirm a decision to modify. Thus, the read-modify switch avoids inadvertent programming erros. Obviously, testing of the read-modify switch after testing the count up and count down keys can be eliminted if this safety feature is not desired.

In summary, the modify box parameters subroutine first requires that an operator insert the correct password. If the correct password is not inserted, box-axis distance values cannot be changed by the operator. After the password test has been passed, the operator can change the current axis number to a desired axis number by pressing the count up and count down keys. After the desired axis number is reached, the function address key is actuated. After the function address key is actuated, the modify box parameter subroutine makes a pass through the get axis parameters subroutine. This pass results in the box-axis data being transferred to a scratch pad or working memory. The operator then uses the count up and count down keys to change the box-axis distance values. The final value is stored in the original memory when the program exits the change value portion of the modify box parameters subroutine.

The foregoing description has described how the axis positions for each axis of each box number are programmed. The move to box position subroutine (FIG. 7), which is entered when the run-program switch 121 is in the run position, controls the movement of the movable elements to their programmed position.

As will be better understood from the following detailed description, the move to box position subroutine first controls the movement of the movable elements of the case handling machine such that all of the movable elements are moved to their home position if an axis homed flag is not set. The axis homed flag is in a clear state when power is first applied to the programmable controller, which occurs when the case handling machine is powered up. When the axis homed flag is not set, the program cycles through a home all axis subroutine that causes all of the movable elements to move to their home position. The home all axes subroutine is bypassed if the axis homed flag is set, provided no unusual condition exists, such as one element (e.g., a box stop) is in a peculiar position (e.g., less than or equal to three inches from its home position).

After all of the movable elements are at their home position, or if the home all axes subroutine is bypassed, the direction of axes movement is determined and the resultant direction data used to determine if movement of the movable elements in the determined direction is likely to create a conflict if the normal numerical axis sequence is followed when the movable elements are moved. If a conflict is likely to occur, the normal numerical axis sequence is reordered to avoid the conflict. Then the movable elements are moved in the chosen sequence to their programmed positions.

Figure 7:
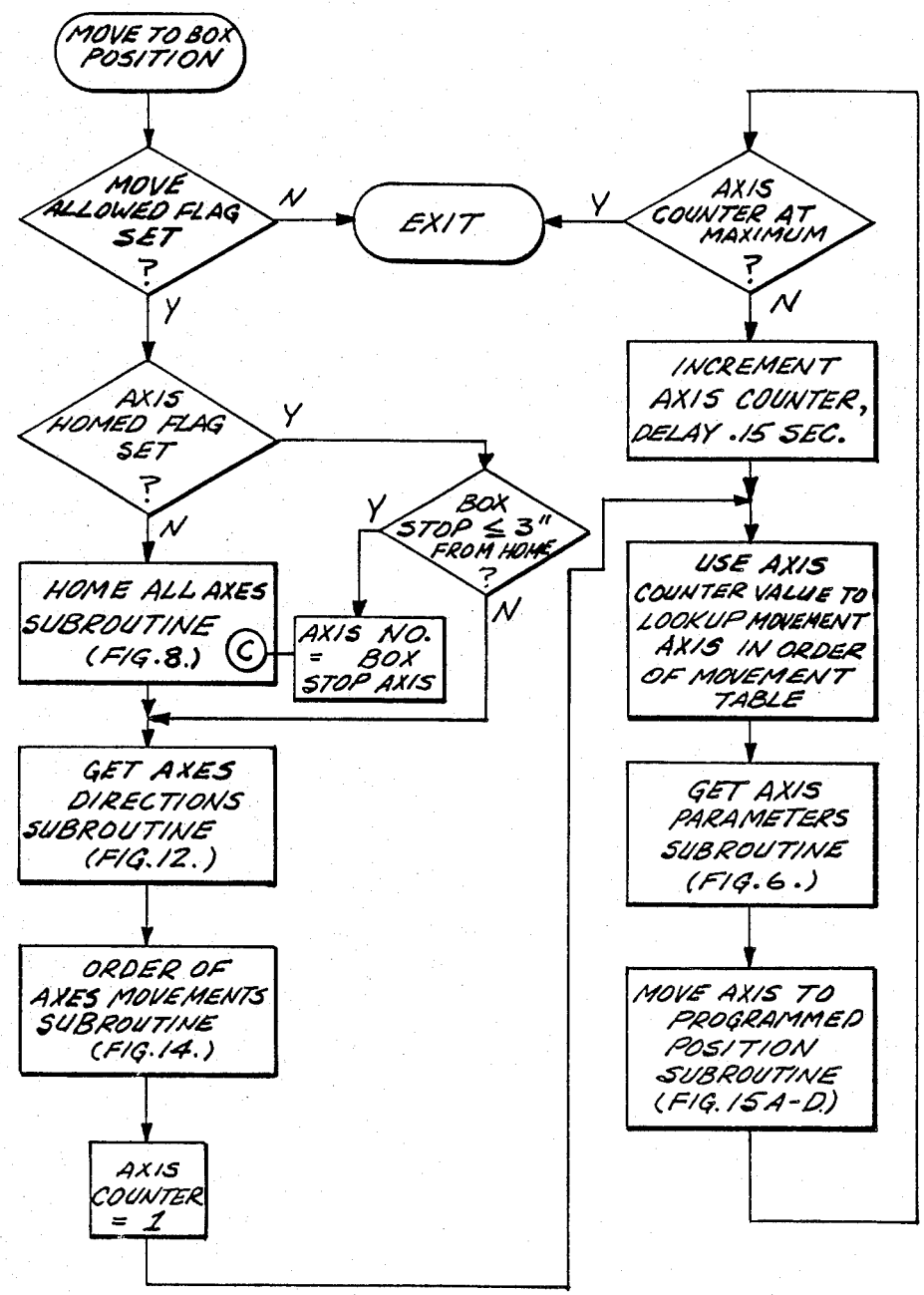
FIG. 7 is a flow diagram of a move to box position subroutine suitable for use in the main program illustrated in FIG. 4.

As shown in FIG. 7, the first step of the move to box position subroutine is a test to determine if the move allowed flag is set. As shown in FIG. 4 and discussed above, the move allowed flag is set either after the program variables are cleared during the initialization sequence or during a pass through the programming sequence that sets the box number. If the move allowed flag is not set, the program exits the move to box position subroutine and cycles to the point in FIG. 4 where the run-program switch test occurs. In order to get out of this loop, it is necessary to place the run-program switch in the program position and, then, return it to the run position.

If the move allowed flag is set when the move to box position subroutine is entered, a test is made to determine if the axis homed flag is set. (As discussed below, the axis homed flag is set during the home axis subroutine shown in FIG. 9). If the axis homed flag is not set, the home all axes subroutine illustrated in FIG. 8 and described below is entered. If the axis homed flag is set, a test is made to determine if a particular axis is in a particular position. More specifically, in the illustrated embodiment of the invention, a test is made to determine if the position of a box stop is less than or equal to three inches from its home position. If the box stop is neither less than nor equal to three inches from its home position, the home all axes subroutine is bypassed. If the box stop is less than or equal to three inches from its home position, the current axis number is set equal to the box stop axis number and, then, the home axis subroutine is entered at a different point described below with respect to FIG. 8.

The last described sequence, i.e., the test to determine if the box stop is less than or equal to three inches from its home position, is designed to illustrate that, in some instances, rather than simply moving each movable element from an old position to a new position in the axis numerical sequence, it may be necessary to take some other action first if a particular circumstance exists. In the illustrated embodiment of the invention, the case handling machine illustrated in FIG. 1 includes a box stop. If the box stop is within three inches of its home position, homing of the box stop and higher numbered axes movable elements is required before the movable elements are moved to their programmed positions.

Figure 8:
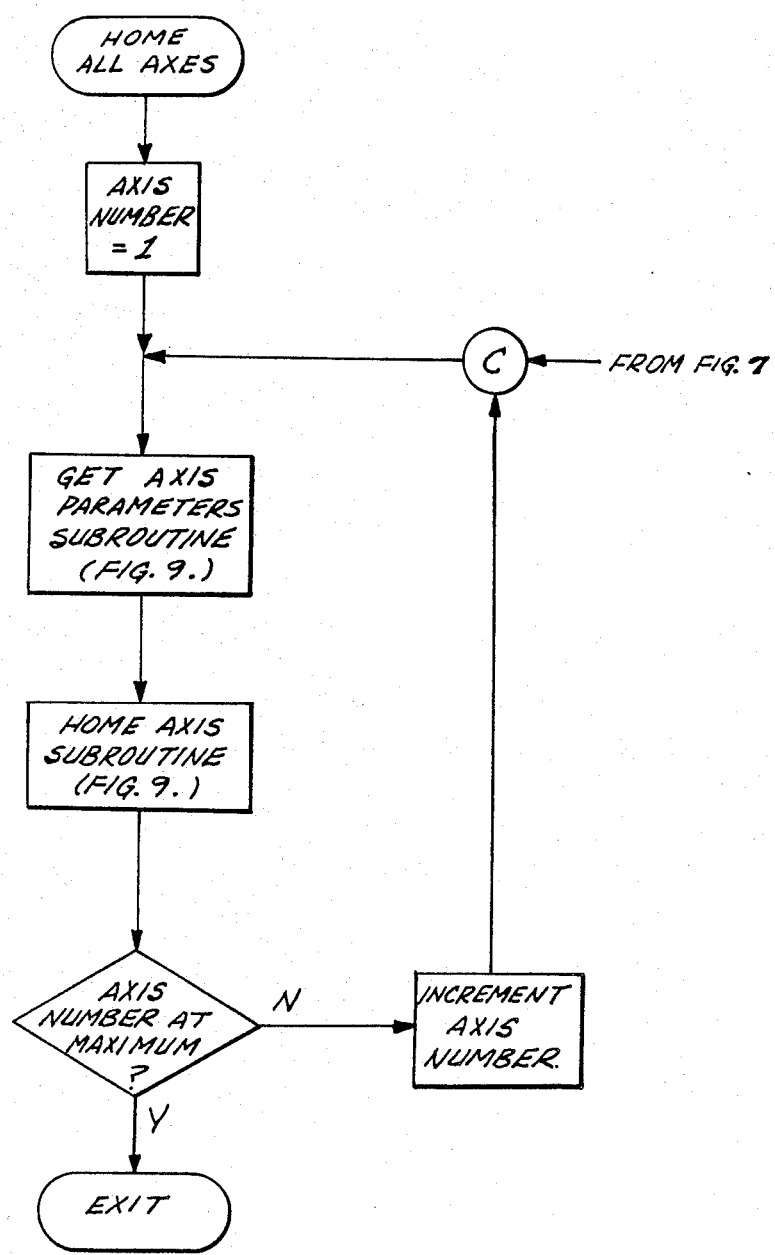
FIG. 8 is a flow diagram of a home all axes subroutine suitable for use in the move to boxes position subroutine illustrated in FIG. 7.

The first step in the home all axes subroutine illustrated in FIG. 8 is to set the current axis number equal to one. Thereafter, a pass is made through the get axis parameters subroutine illustrated in FIG. 6 and decribed above. After the axis parameters related to the current axis number are transferred into the scratch pad memory, the home all axis subroutine makes a pass through a home axis subroutine, illustrated in FIG. 9 and described below, which results in the movable element of axis number one being moved to its home position. After the movable element of axis number one has been moved to its home position, a test is made to determine if the axis number is at maximum. If the axis number is not at maximum, the axis number is incremented, and a pass is made through the get all axis parameters subroutine followed by a pass through the home axis subroutine. This sequence continues until the axis number is incremented to its maximum value. When this occurs, the home all axes subroutine ends and the program cycles to the get axis direction subroutine.

As discussed above, if the axis homed flag is set and if the box stop is three inches or less from its home position, the current axis number is set equal to the box stop axis prior to entering the home all axes subroutine. When this occurs, the box stop is moved to its home position followed by the movable element of all higher numbered axes being moved to their home positions. The movable elements of lower numbered axes are not homed.

Figure 9:
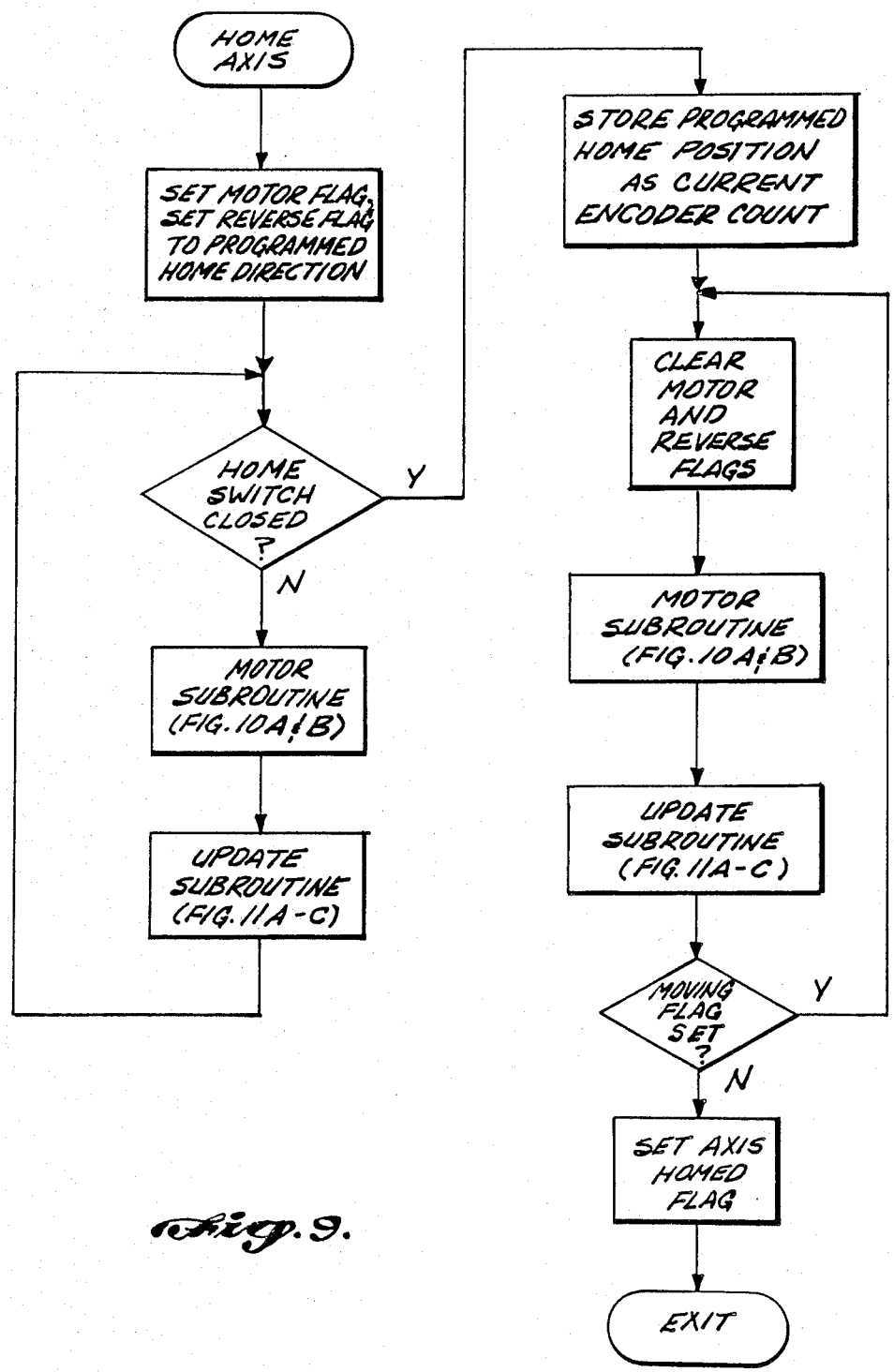
FIG. 9 is a flow diagram of a home axis subroutine suitable for use in the home all axes subroutine illustrated in FIG. 8.

The first step of the home axis subroutine illustrated in FIG. 9 is to set (i) a motor flag; and, (ii) a reverse flag to the programmed home direction. More specifically, the pass through the get axis parameters subroutine that occurs just prior to a pass through the home axis subroutine shown in FIG. 8 among other items resulted in data denoted the direction of movement needed to reach the home position being transferred to the scratch pad memory. This data is used to control the set/clear state of the reverse flag.

After the reverse flag is set to appropriate set/clear state, a test is made to determine if the current axis home switch is in the closed or opened state that denotes that the movable element is in the home position. While various types of home switches can be used, preferably, the home switches are microswitches that are closed when the movable element is in the home position. Hence, in the illustrated embodiment of the invention, the home switches are tested to determine if they are closed. If the home switch is not closed, a pass is made through the motor subroutine (FIGS. 10A and 10B), followed by a pass through the update subroutine (FIGS. 11A-C). During this and subsequent passes through these subroutines, the drive motor is brought up to speed and the realted movable element moved toward its home position. The program cycles through the loop formed by the home switch closed test, the motor subroutine and the update subroutine until the home switch is closed. When this occurs, the programmed home position in the scratch pad memory is stored as the current encoder count value. This value may be zero or any other numerical value chosen to denote the home position. After the value is stored, the motor and reverse flags are cleared. Thereafter, a pass is made through the motor subroutine (FIGS. 10A and 10B) followed by a pass through the update subroutine (FIGS. 11A-C). Then a test is made to determine if the moving flag is set. If the moving flag is set, the motor and reverse flags are cleared and a second pass is made through the motor subroutine, followed by a pass through the update subroutine.

The program remains in the just described loop until the moving flag is not set. As will be better understood from the following discussion of the update subroutine, the moving flag remains set until the motor stops. When the moving flag is cleared, the program sets the axis homed flag, and leaves the home axis subroutine.

The motor and update subroutine are both lower order subroutines that are universal, i.e., they are used in various higher order subroutines. As will be better understood from the following description, during motor start-up the motor subroutine sets two count down timers, one to the sum of the contact make delay times of the motor and reverse relays associated with the current axis, which are in the scratch pad memory (denoted Timer No. 1), and the other to the up-to-speed delay time of the drive motor associated with the current axis, which is also in the scratch pad memory (denoted Timer No. 2). The motor subroutine also controls the closing of the axis motor and main power relays and the setting of the reverse relay shown in FIG. 3. During motor shut down, the motor subroutine sets Timer No. 1 to the contact unmake time of the main power relay and controls the opening of the axis motor and main power relays, and the resetting of the reverse relay. The relay closure and opening sequences are controlled such that during motor startup the main power relay is closed after the motor power relay is closed and the reverse relay is set, and during motor shut down the main power relay is open before the motor power relay is opened and the reverse relay is reset.

Figure 15A:
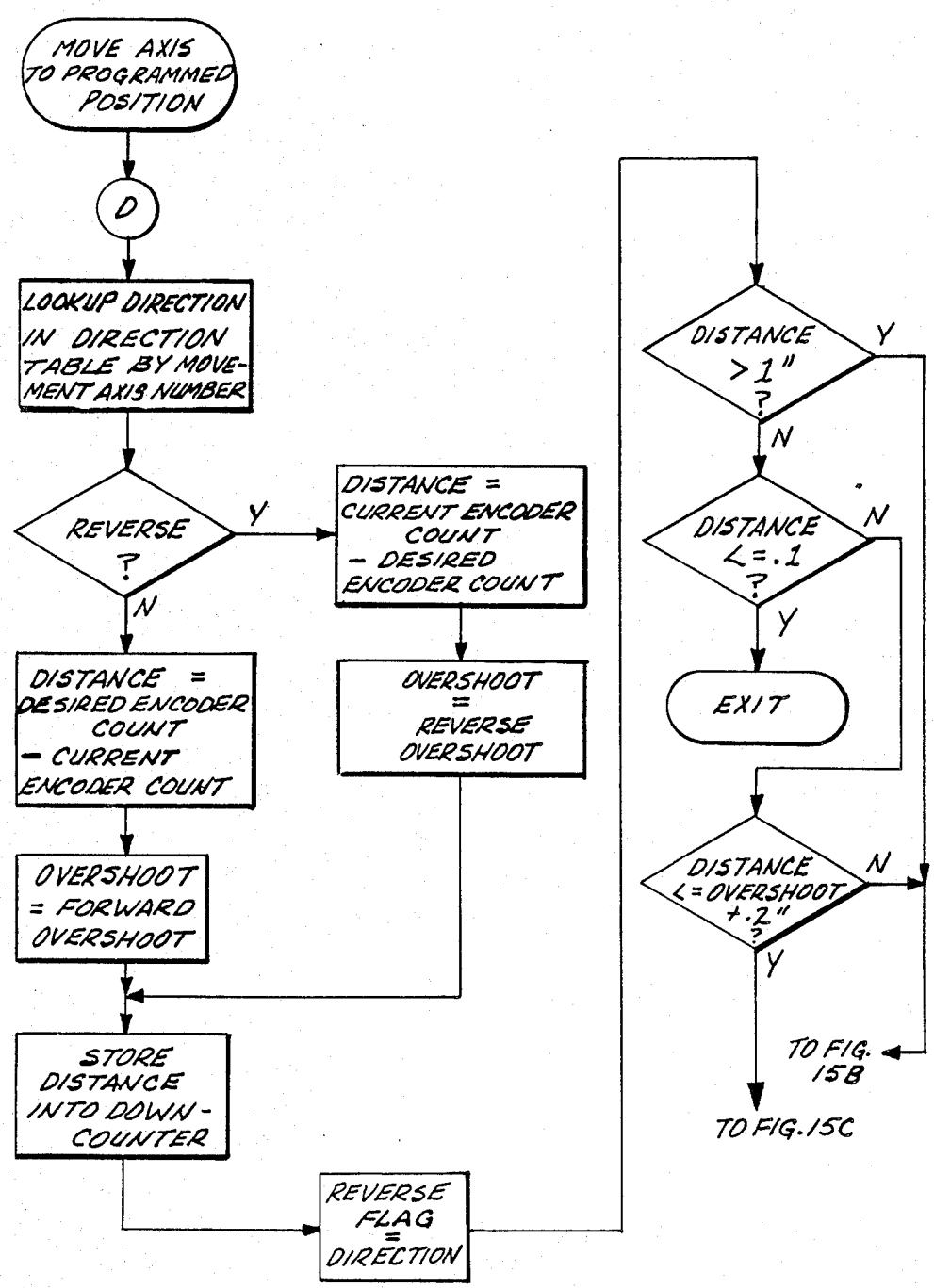
Figure 15B:
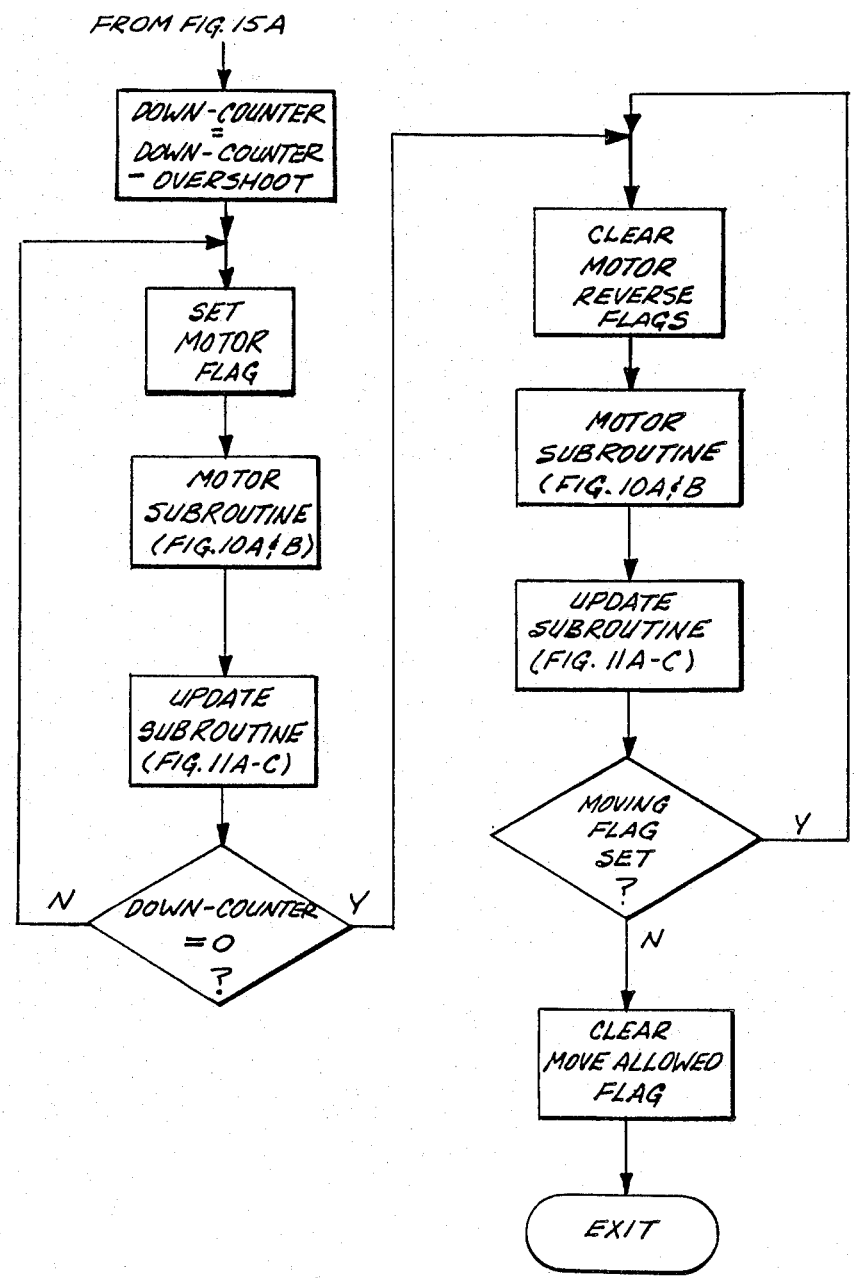

The update subroutine reads the encoder phase A and phase B outputs and determines the direction of movement of the movable element that is being moved. The occurrence of encoder pulses, and the direction of movement data are used to increment or decrement an encoder count value. The encoder pulses are also used to increment or decrement a speed counter and a downcounter. After a time adequate for the axis motor to get up to speed, the speed counter value is tested during the update subroutine at periodic intervals to determine if the movable element is moving at or above a minimum speed. If the speed is below the minimum, the program assumes that the movable element being moved has hit an obstruction and sets a jam flag that is tested during a pass through the motor subroutine. The count down counter is used (e.g., tested) during the hereinafter described move axis to programmed position subroutine (FIGS. 15A-B). Finally, the update subroutine tests a homing flag that is set during a diagnostic test subroutine and clears and sets certain flags, and stores position information when the related home switch is closed.

Figure 10A:
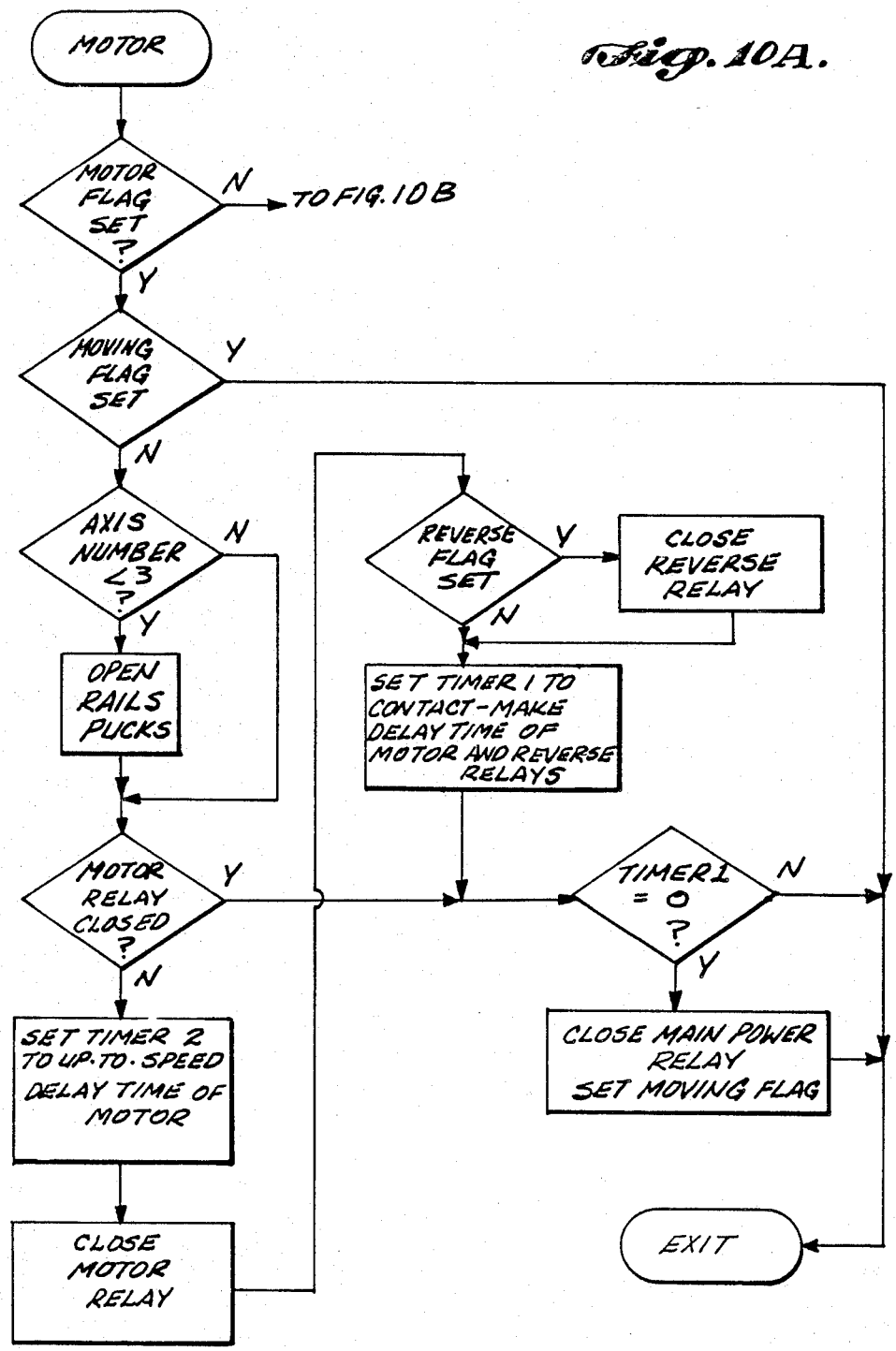
FIGS. 10A-B are flow diagrams of a motor subroutine suitable for use in the home axis subroutine illustrated in FIG. 9 and in other subroutines.
Figure 11A:
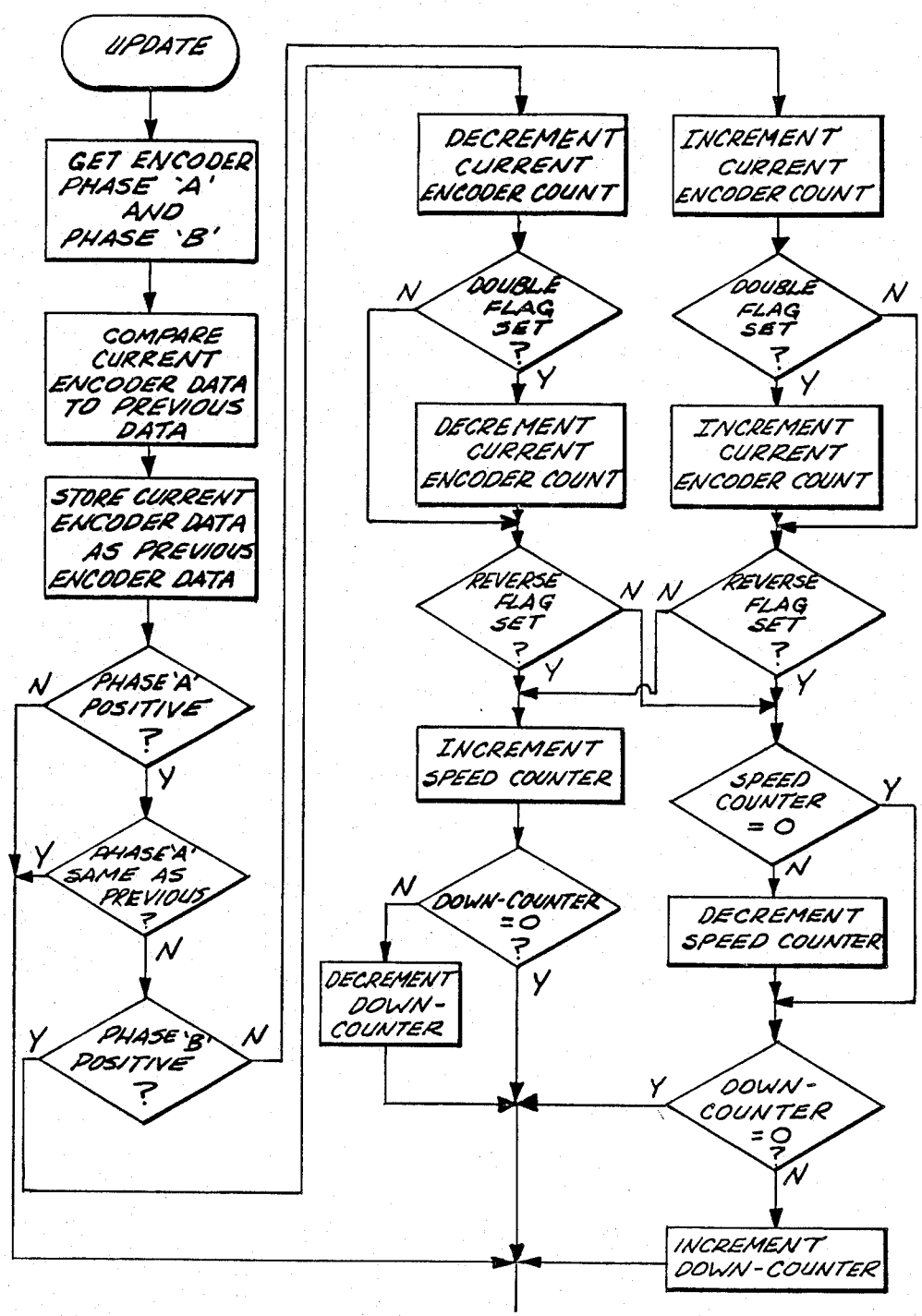
FIGS. 11A-C are flow diagrams of an update subroutine suitable for use in the home axis subroutine illustrated in FIG. 9 and in other subroutines.
Figure 11B:
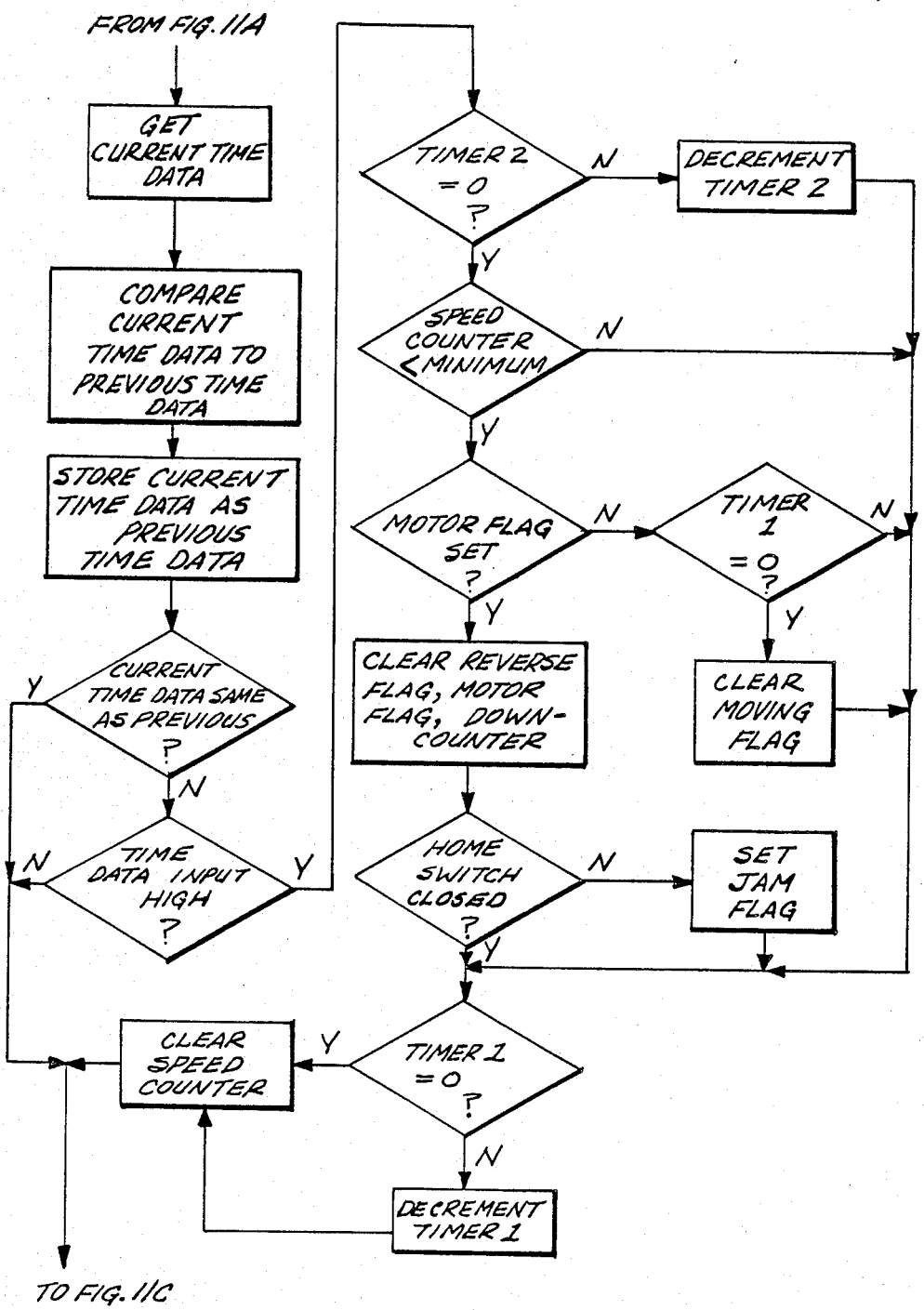
Figure 11C:
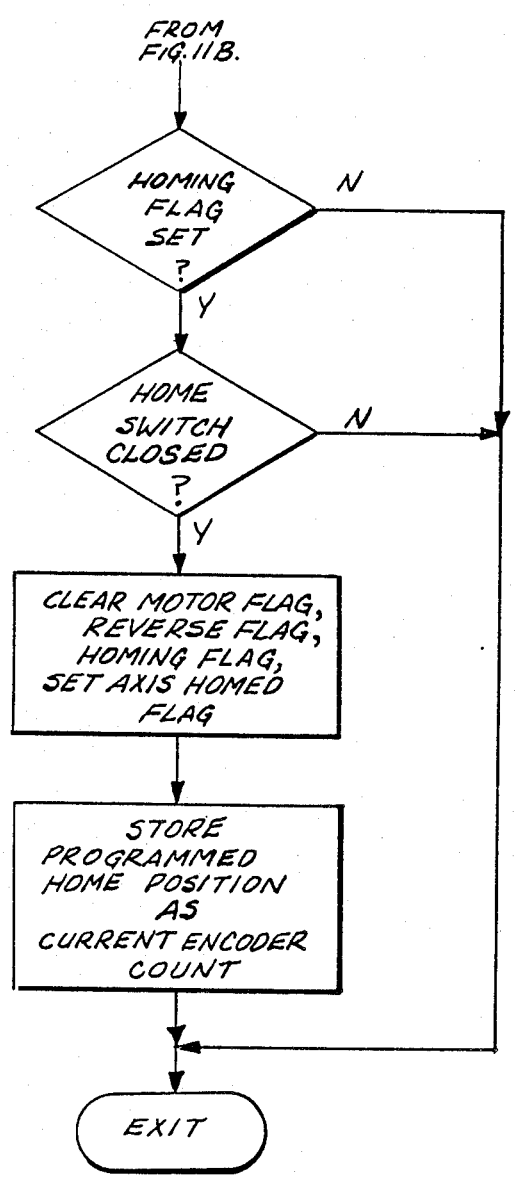

The first step of the motor subroutine illustrated in FIG. 10A is to determine if the motor flag is set. As shown in FIG. 9 and described above, the motor flag is set when the home axis subroutine is first entered and cleared when the related home switch is sensed. If the motor flag is set, a test made to determine if the moving flag is set. If the moving flag is set, the program exits the motor subroutine and cycles to the update subroutine. Because both the motor and the moving flags are set, no action is required by the motor subroutine, because the drive motor for the axis being controlled is being commanded to move the movable element and the movable element is moving.

If the moving flag is not set, a preliminary sequence of steps is followed that may not be necessary in many cases handling machines. The preliminary sequence of steps is designed for use in a case handling machine, such as the one illustrated in FIG. 1, that includes rail pucks for holding two movable elements, namely rails, in line with one another. The rail pucks must be released before the rails can be moved. More specifically, if the moving flag is not set, a test is made to determine if the axis number is less than three. If the axis number is less than three, i.e., one or two, the rail pucks are opened and the rails released. If the axis number is not less than three, or after the rail pucks have been opened, the program tests the motor control output to determine if the motor relay related to the current axis is closed. If the motor relay is not closed, the up-to-speed delay time of the motor is used to set Timer No. 2.

After the up-to-speed delay time is used to set Timer No. 2, the motor relay 99a, 99b, 99c . . . associated with the current axis, i.e., the axis being homed, is actuated. Even when the motor relay closure is completed, the motor does not start because, as shown in FIG. 3 and described above, the reverse and main power relays must be closed before power is actually applied to the associated drive motor 101a, 101b, 101c.

After the motor relay is commanded to close, a test is made to determine if the reverse flag is set. If the reverse flag is set, the reverse relay is closed. Closure of the reverse relay results in a reversal of the polarity of the power applied to the drive motors via the motor relays. If the reverse flag is not set or after the reverse relay is commanded to close, Timer No. 1 is set to the contact-make delay time of the motor and reverse relays. Next, a test is made to determine if the output of Timer No. 1 is equal to zero. If the output of Timer No. 1 is not equal to zero, the program exits the motor subroutine and enters the update subroutine (FIGS. 11A-C), as shown in FIG. 9. In essence, the program waits until Timer No. 1 times out. During the pass through the motor subroutine, which occurs after Timer No. 1 times out, i.e., equals zero, the main power relay is commanded to close; and, the moving flag to set. Thereafter, the program exits the motor subroutine.

Figure 10B:
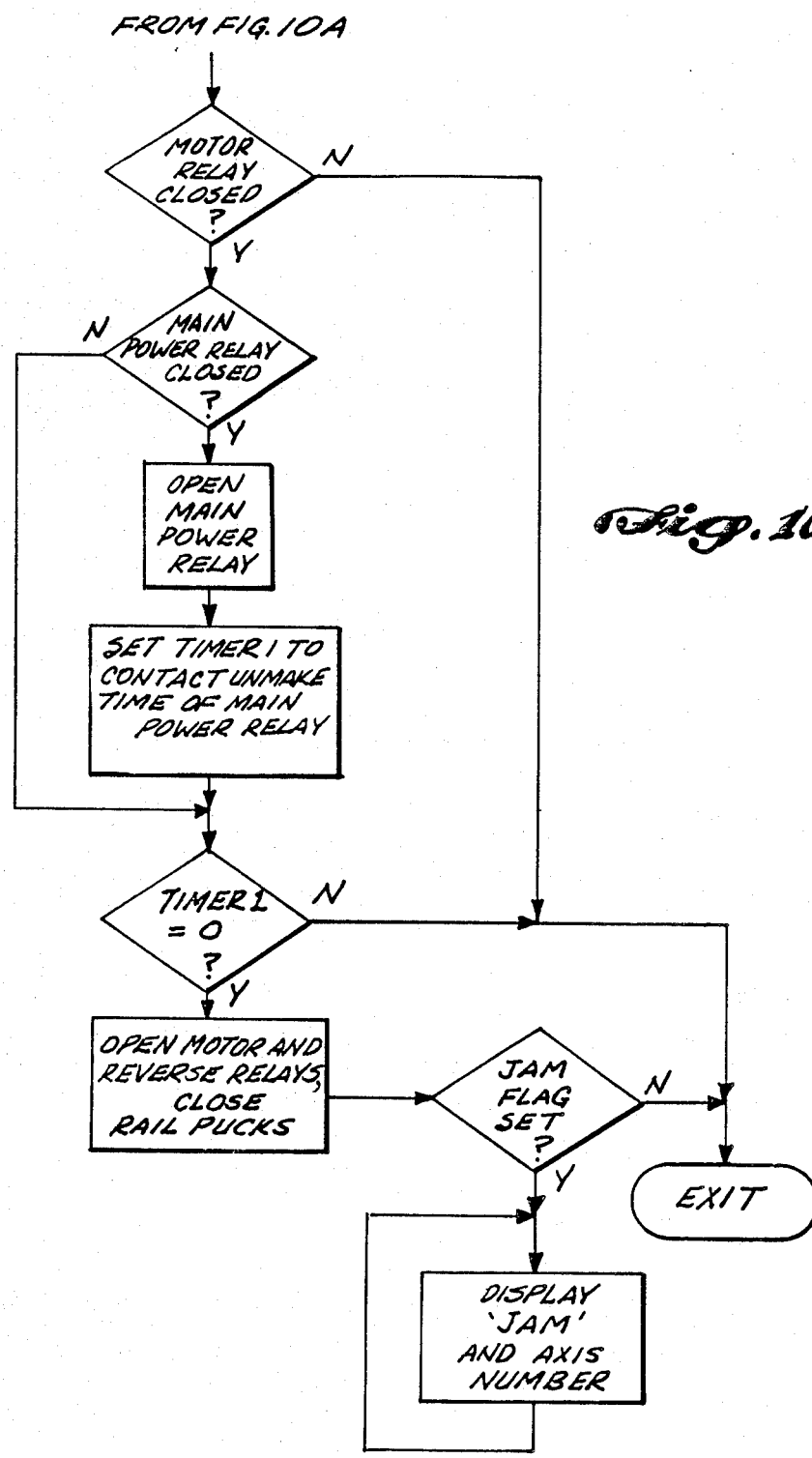

As shown in FIG. 10B, if the motor flag was not set when the motor subroutine was entered, a test is made to determine if the motor relay is being commanded to close. If the motor relay is not closed, the program cycles to the update subroutine, as illustrated in FIG. 9. Thus, if the motor flag is not set (which indicates that the drive motor is not being commanded to move the movable element) and the motor relay is not closed (which means power is not still being applied to the drive motor), the motor subroutine is bypassed.

If the motor relay is closed, a test is made to determine if the main power relay is being commanded to close. If the main power relay is closed, the main power relay is commanded to open. Thereafter, Timer No. 1 is set to the main power relay contact unmake delay time.

After Timer No. 1 is set to the main power relay contact unmake delay time, or if the main power relay was not closed, a test is made to determine if Timer No. 1 has timed out, i.e., if the output of Timer No. 1 is equal to zero. If the output of Timer No. 1 is not equal to zero, the program cycles to the update subroutine, as illustrated in FIG. 9. If the output of Timer No. 1 is equal to zero, which means that the main power relay contacts have had time to open, the motor and reverse relays are commanded to open and the rail pucks are closed. (Obviously, if rail pucks are not included in the case handling machines incorporating the invention, they are not closed).

After the motor and reverse relays have been commanded to open, a test is made to determine if a flag, denoted the jam flag, is set. (As will be better understood from the following description of the update subroutine illustrated in FIGS. 11A-C, the jam flag is set when movement of the movable element along the axis being controlled is impeded). If the jam flag is set, JAM and the axis number is displayed. The program cycles through a loop causing this display to continue to be displayed until the operator takes action to eliminate the jam. If the jam flag is not set, the program cycles to the update subroutine (FIGS. 11A-C), as shown in FIG. 9.

As illustrated in FIG. 11A, the first step in the update subroutine is to read the current encoder data, i.e., the encoder phase A and phase B pulses. Then, the current encoder data is compared to the previous encoder data. Next, the current encoder data is stored as the previous encoder data. Thereafter, a series of tests are made of the current encoder data. The first test determines if phase A of the current encoder data is positive. If phase A is not positive, the program cycles to the portion of the update subroutine illustred in FIG. 11B and described below. If phase A is positive, a test is made to determine if the current state of phase A is the same as the previous state, i.e., the state of phase A prior to being updated to the current state of phase A. If the values are the same, no change has occurred and the update subroutine cycles to the portion thereof illustrated in FIG. 11B and described below. If the current state of phase A is not the same as the previous state, a test is made to determine if the current state of phase B is positive. If the current state of phase B is positive, a current encoder count is decremented. If phase B is not positive, the current encoder count is incremented.

In essence, the tests of phase A and phase B determine the direction of encoder movement and, thus, the direction of movement of the movable element being moved. If the movable element is moving in one direction, i.e., the forward direction, the current encoder count is incremented and if the movable element is being moved in the other direction, i.e., the reverse direction, the current encoder count value is decremented.

After the current encoder count value has been decremented, due to phase B being positive, a test is made to determine if the double flag is set. If the double flag is set, the current encoder count value is decremented again. If the double flag is not set, or after the current encoder count has been decremented for a second time, a test is made to determine if the reverse flag is set. If the reverse flag is set, a speed counter is incremented. Thereafter, a test is made to determine if the down-counter value is equal to zero. If the down-counter value is not equal to zero, it is decremented. If the down-counter value is equal to zero or after the down-counter has been decremented, the update subroutine shifts to the portion thereof illustrated in FIG. 11B and described below.

If the reverse flag is set after the double flag has been tested, and the current encoder count decremented if the double flag was set, the speed counter is tested to determine if it is equal to zero. If the speed counter is equal to zero, it is decremented. After the speed counder is decremented, or if the speed counter is not equal to zero, a test is made to determine if the down-counter is equal to zero. If the down-counter is not equal to zero, it is incremented. After the down-counter has been incremented, or if the down-counter is equal to zero, the program cycles to the portion of the update subroutine illustrated in FIG. 11B and described below.

After the current encoder count value has been incremented, due to the phase B being negative, a test is made to determine if the double flag is set. If the double flag is set, the current encoder count is incremented again. After the current encoder count has been incremented for the second time, or if the double flag is not set, a test of the reverse flag is made. If the reverse flag is not set, the speed counter is incremented. Then, the down-counter is tested. If the down-counter is not equal to zero, it is decremented. After the down-counter has been decremented, or if the down-counter is equal to zero, the program cycles to the portion of the update subroutine illustrated in FIG. 11B.

If the reverse flag is set after the double flag is tested and the current counter incremented if the double flag is set, the speed counter is tested. If the speed counter is not equal to zero, the speed counter is decremented. After the speed counter has been decremented, or if the speed counter is equal to zero, the down-counter is tested. If the down-counter is not equal to zero it is incremented. After the down-counter has been incremented or if the down-counter is not equal to zero, the update subroutine cycles to the portion thereof illustrated in FIG. 11B and described below.

As will be readily appreciated from the foregoing description, the testing of the relationship between phase A and phase B determines the direction of movement of the movable element that is being moved by one of the drive motors. Depending upon direction of movement, the current encoder count is either incremented or decremented. If a double flag is set, the counter is again incremented or decremented a second time. Thereafter, a test is made to determine if the reverse flag is set. If the reverse flag is set and decrementing pulses are occurring, the speed counter is incremented because the movable element is moving in the chosen direction. Contrariwise, if the reverse flag is not set and decrementing pulses are occurring, the speed counter is decremented because the movable element is moving in the wrong direction. It may be hunting or have hit an impediment, for example. Similarly, if the reverse flag is not set and increment pulses are occurring, the speed counter is incremented because the movable element is moving in the chosen direction. If the reverse flag is set and increment pulses are occurring, the speed counter is decremented because the movable element is moving in the wrong direction. After the speed counter has been incremented, or decremented to zero, the down-counter is tested and decremented if not at zero and the speed counter has been incremented, or incremented if not at zero and the speed counter has been decremented. As will be better understood from the following description of the move axis to programmed position subroutine (FIGS. 15A-B), the down-counter is set to the absolute difference between the current position and the desired position of the movable element. Because the down counter is incremented or decremented for each increment of movement in the forward or reverse direction, the movable element will be at the chosen position when the down-counter value reaches zero.

The first step of the portion of the update subroutine illustrated in FIG. 11B is to read the current time data generated by an internal time clock. Thereafter, the current time data is compared to the previous time data. Then, the current time data is stored as the previous time data.

Next, a test is made to determine if the current time data is the same as the previous time data. If the current time data is the same as the previous time data, the program cycles to the portion of the updata subroutine illustrated in FIG. 11C and described below. If the current time data is not the same as the previous time data, a test is made to determine if the time data input is high. In this regard, the time data is in the form of pulses. This test is designed to make certain that only pulses of one type, e.g., high pulses, are recognized. Thus, if the time data input is not high, the program cycles to the portion of the update subroutine illustrated in FIG. 11C and described below. If the time data input is high, a test is made to determine if the output of Timer No. 2 is equal to zero. Thus, the updata subroutine only reaches the Timer No. 2 test if the current time data has changed and if the state of the current time pulse is the one being recognized.

As discussed above with respect to FIG. 10A, Timer No. 2 is a countdown timer that is initially set to the up-to-speed delay time of the drive motor associated with the axis being controlled. If output of Timer No. 2 is not equal to zero, Timer No. 2 is decremented. Thereafter, a test is made to determine if the output of Timer No. 1 is equal to zero. As described above with respect to FIG. 10A, Timer No. 1 stores the make delay time of the motor and reverse relays, or the contact unmake time of the main power relay depending upon whether the drive motor is being commanded to start or stop. If Timer No. 1 is not equal to zero, it is decremented. After Timer No. 1 has been decremented, or if Timer No. 1 is equal to zero, the speed counter is cleared and the program cycles to the portion of the update subroutine illustrated in FIGURE C as described below.

If Timer No. 2 is equal to zero after the current time data tests are passed, the speed counter is tested to determine if its value is less than a minimum value. Thus, the speed counter is only tested after the drive motor has had time to get up to speed. If the speed counter value is not less than a minimum value, the program cycles to the point where Timer No. 1 is tested and decremented if not equal to zero prior to clearing the speed counter and cycling to the portion of the update subroutine illustrated in FIG. 11C. Thus, the remaining portion of the update subroutine illustrated on the right side of FIG. 11B and described below is bypassed if the drive motor is moving the movable element at a speed above a minimum speed. As will be better understood from the following description, this above minimum speed test establishes the absence of a jam.

If the speed counter is less than the minimum value, a test is made to determine if the motor falg is set. If the motor flag is not set, a test is made to determine if Timer No. 1 is equal to zero. If Timer No. 1 is equal to zero, the moving flag is cleared. If Timer No. 1 is not equal to zero, or after the moving flag is cleared, the program cycles to the point where Timer No. 1 is tested and decremented if not equal to zero; and, the speed counter is cleared. This path is followed when the motor has been commanded to stop and is slowing down, or has come to a stop because in these cases a low speed counter value does not denote a jam.

If the motor flag is determined to be set after the speed counter is determined to be below the minimum value, the reverse flag, the motor flag and the count down counter, are all cleared. Then a test is made to determine if the home switch is actuated, i.e., closed. If the home switch is not closed, the jam flag is set. If the speed is below the minimum, and the drive motor is being commanded to move the movable element (as shown by the motor flag being set), the program assumes that a jam has taken place and shuts down the drive motor by clearing the reverse and motor flags. The assumption is overcome, and the jam bypassed, if the home switch is actuated because such actuation means the jam is created by the movable element reaching the end of its path of travel, not by an external item such as a foreign object in the case handling machine.

After the jam flag is set or if the home switch is not set, the update subroutine cycles to the point where Timer No. 1 is tested and decremented if not equal to zero; and, then, the speed counter is cleared.

As will be readily appreciated from the foregoing description, the jam flag is only set if the motor is being instructed to move the movable element at a steady speed and the movable element is moving with a low speed. During motor start up when the motor is instructed to slow down or when the movable element is hitting its home switch, the jam flag set step is bypassed.

Figure 17:
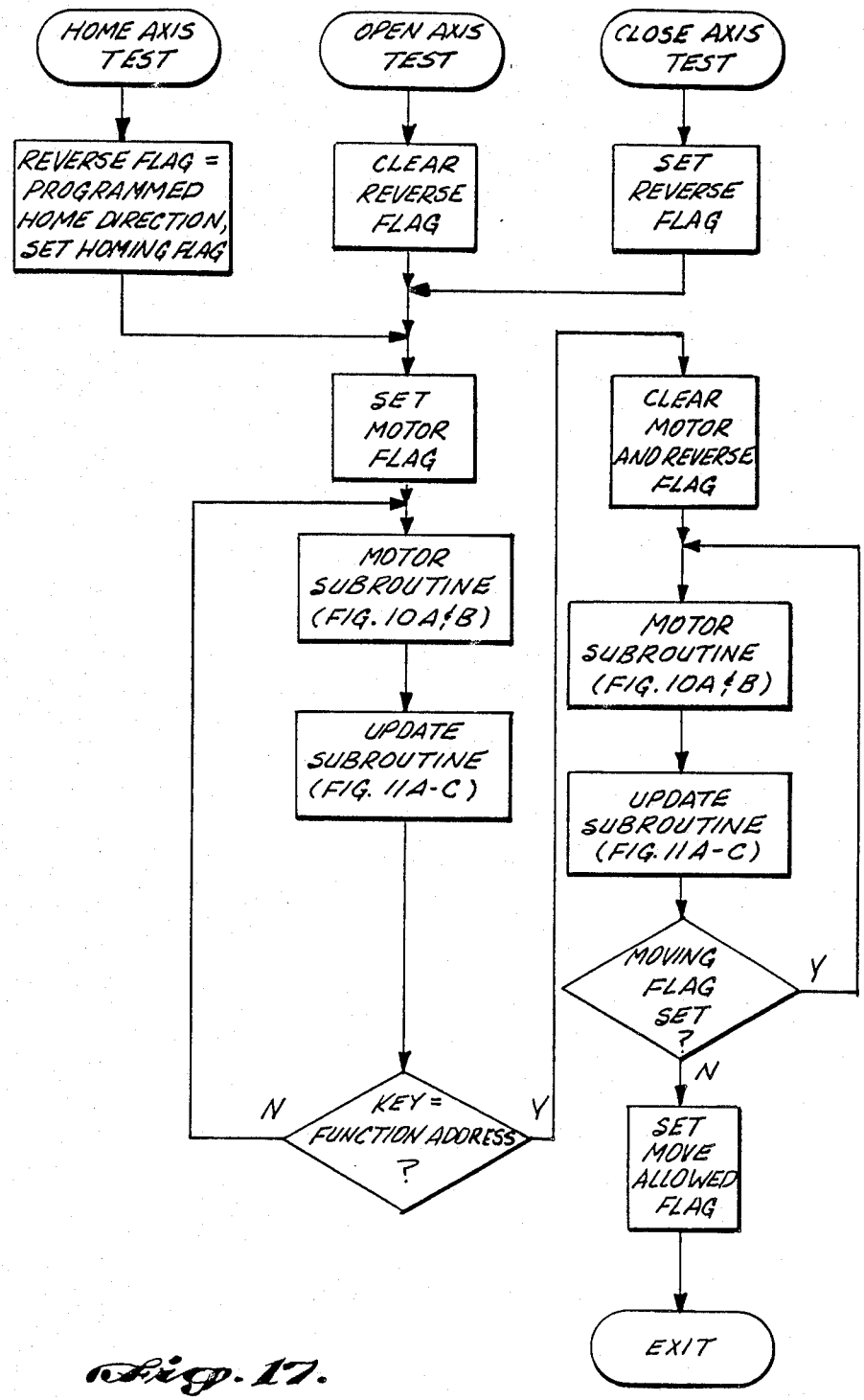
FIG. 17 is a flow diagram of home, open and close axis test subroutine suitable for use in the diagnostic subroutine illustrated in FIGS. 16A-B.

The first step in the portion of the update subroutine illustrated in FIG. 11C is a test to determine if a homing flag is set. As will be better understood from the following description of the diagnostic subroutine, the homing flag is set during the home axis test (FIG. 17). If the homing flag is not set, the program exits the update subroutine. If the homing flag is set, a test is made to determine if the home switch is actuated, i.e., closed. If the home switch is not closed, the program exits the update subroutine. If the home switch is closed, the motor flag, the reverse flag and the homing flag are all cleared; and, the axis homed flag is set. Thereafter, the programmed home position of the axis is stored as the current encoder count value. Then the program exits the update subroutine. Thus, the motor control flags are cleared when the movable element being controlled reaches its home position.

As shown on the left side of FIG. 9, passes are continuously made through the motor subroutine and the update subroutine until the home switch is actuated, i.e., closed, unless a jam occurs. If a jam occurs, power to the motor is terminated as described above.

Figure 12:
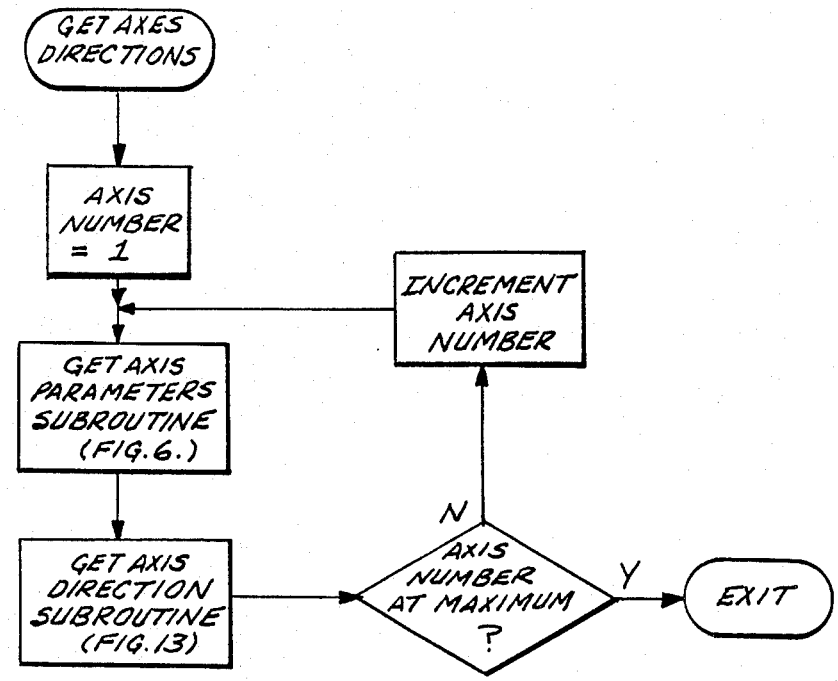
FIG. 12 is a flow diagram of a get axes direction subroutine suitable for use in the move to box position subroutine illustrated in FIG. 7.

As shown on the right side of FIG. 9, when the movable element reaches its home position and the home switch is closed, the programmed home position (in encoder counts) is stored as the current encoder count. Thereafter, the motor and reverse flags are cleared. Since the drive motor being controlled may still be running when the home switch is closed, until movement of the movable element stops, the home axis subroutine cycles through a loop formed by the motor and update subroutines. During each loop, a test is made of the moving flag. If the moving flag is set, another pass is made through the motor and update subroutines. As described above, when movement of the movable element ends, the moving flag is cleared. When this happens, the axis homed flag is set and the program exits the home axis subroutine and returns to the home all axes subroutine (FIG. 8). Thereafter, as noted above, the axis number is incremented and the next axis is homed, unless the axis number is at its maximum value. If the axis number is at its maximum value, the program returns to the move to box position subroutine (FIG. 7) and moves on to the get axes directions subroutine illustrated in FIG. 12 and described next.

The first step of the get axes directions subroutine is to set the current axis number equal to one. Thereafter, a pass is made through the get axis parameters subroutine (FIG. 6) which results in the parameters for axis number 1 being shifted into the scratch pad memory. Then, the program enters the get axis direction subroutine illustrated in FIG. 13.

The first step of the get axis direction subroutine is a test to determine if the desired position is less than the current position. If the desired position is not less than the current position, i.e., the desired position is larger than the current position, the direction to be moved by the movable element is determined to be the forward direction. If the desired direction is less than the current direction, the direction to be moved by the movable element is determined to be the reverse direction. The direction determined is stored in a direction table by axis number. Thereafter, the program exits the get axis direction subroutine and returns to the get axes directions subroutine illustrated in FIG. 12.

Figure 13:
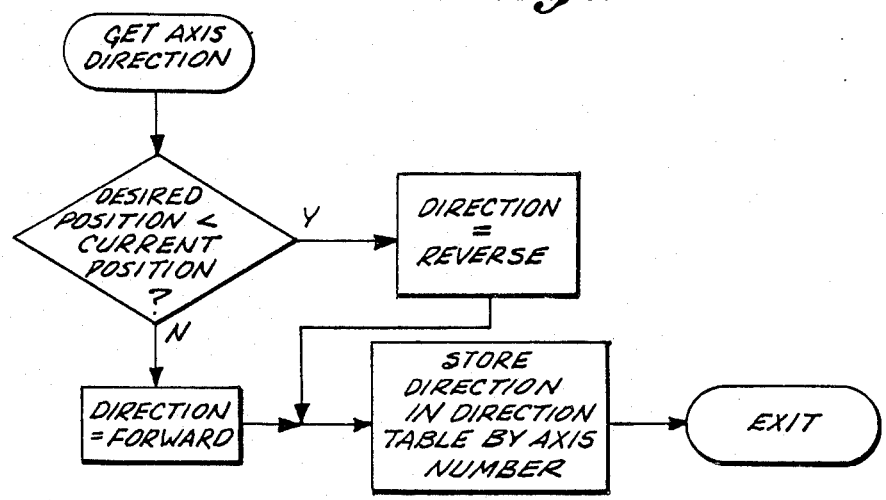
FIG. 13 is a flow diagram of a get axis direction subroutine suitable for use in the get axes directions subroutine illustrated in FIG. 12.

The next step in the get axes directions subroutine is to determine if the axis number is at the maximum axis number. If the axis number is not at the maximum axis number, the axis number is incremented and a second pass is made through the get axis parameters subroutine (FIG. 6). As a result, the parameters related to the new axis number are transferred to the scratch pad memory. Thereafter, the second pass is made through the get axis direction subroutine (FIG. 13). This loop of the get axes directions subroutine is followed until the axis number is equal to the maximum axis number. When the axis number is equal to the maximum number, the program exits the get axes directions subroutine.

Figure 14:
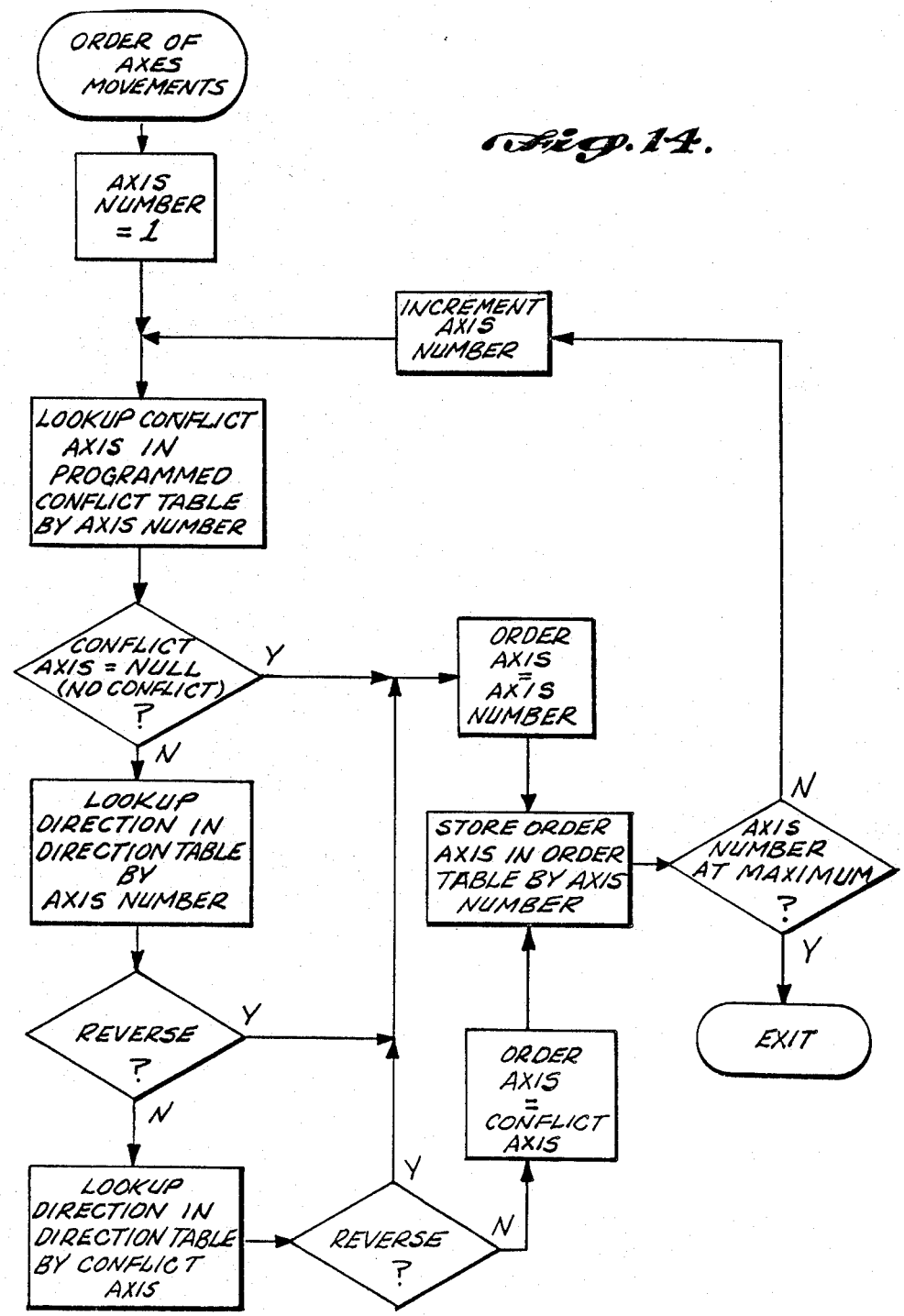
FIG. 14 is a flow diagram of an order of axis movements subroutine suitable for use in the move to box position subroutine illustrated in FIG. 7.

As shown in FIG. 7, after the program exits the get axes directions subroutine, it enters the order of axes movements subroutine ilustrated in FIG. 14. As will be better understood from the following description, the order of axes movements subroutine sets the order or sequence of axes movements such that the movement of the movable elements of the case handling machine do not impinge on one another.

The first step in the order of axes movements subroutine is to set the current axis number equal to one. Thereafter, the data in a preprogrammed axes conflict table is evaluated to determine if movement of the movable element along the current axis conflicts with the movement of a movable element along another axis. The axes conflict table is stored in a permanent memory, such as an EPROM. If, for example, movement along axis number 1 could conflict with movement along axis number 3, the data in the axes conflict table would indicate a conflict with axis number 3.

In any event, after the program has evaluated the axis conflict table based on the current axis number, a test is made to determine if the evaluation found a conflict. If no conflict was found, the order axis is set equal to the current axis number and the order axis is stored in an order table by the current axis number. Thereafter, a test is made to determine if the current axis number is the maximum axis number. If the current axis number is not at the maximum axis number, the current axis number is incremented and the conflict table is again tested to determine if the movable element along the new current axis is likely to conflict with movement of a movable element along another axis.

If a conflict is found, the direction of movement along the current axis is looked up in a direction table based on the current axis number. Then a test is made to determine if the direction of movement is to be the reverse direction. If the direction of movement is to be the reverse direction and, thus, away from the conflict, rather than toward the conflict, the order axis is set equal to the current axis number and stored in the order table by its axis number. If the direction of movement is not the reverse direction, the direction of movement is looked up in the direction table based on the conflict axis number. Then a test is made to determine if the direction of movement along the conflict axis is in the reverse direction. If the direction of movement along the conflict axis is in the reverse direction, no conflict exists because movement is away from a conflict. As a result, the order axis is set equal to the current axis number and stored in the order by axis number. If movement along the conflict axis is not in the reverse direction, movement along both the current axis and the conflict axis is in the forward direction. As a result, a conflict exists, when this occurs, the order axis is set equal to the conflict axis rather than the current axis; and, the conflict axis, rather than the tested axis is stored as the next movement in the order table. Thereafter, the tested axis number is incremented and another pass is made through the order of axes movements routine. When the current axis number equals the maximum axis number, the program exits the order of axes movements routine.

As will be apprecitaed from the foregoing description of the order of axes movements subroutine, if no conflict exists if the movable elements are moved along their axes in numerical sequence, the order tabel stores the axes numbers in numerical order. If a conflict is found, for example, if movement along axis 1 prior to movement along axis 3 would create a conflict, the table is reordered such that the axis 3 drive motor will be energized before axis 1 drive motor. In essence, axis 3 and axis 1 reverse positions in the order table.

As illustrated in FIG. 7, after thr program exits the order of axes movements subroutine, an axis counter is set equal to one. Then the axis counter value is used to loop up the movement axis in the order of movement table. After the movement axis has been looked up in the order of movement table, a pass is made through the get axis parameters subroutine listing the movement axis. As a result, the movement axis parameters are transferred to the scratch pad memory. Next, the program enters the move axis to programmed position subroutine illustrated in FIGS. 15A–D. As will be better understood from the folllwing description, the move axis to programmed position subroutine causes the movement axis drive motor to move the related movable element to its programmed position.

The first step of the move axis to programmed position subroutine (FIG. 15A) is a lookup of the direction the movable element is to move in the direction table based on movement axis number. Then, a test is made to determine if the direction of movement is the reverse or forward direction of movement. If the direction of movement is the reverse direction of movement, a distance value (in encoder counts) is set equal to the current encoder count value minus the desired encoder count value, i.e., the encoder count value that represents the desired (programmed) position of the movable element. Thus, the distance value denotes the distance to be moved. Then an overshoot value is set equal to the reverse overshoot value for the movement axis, which is one of the axis parameters transferred to the scratch pad memory. If the direction of movement is not the reverse direction, the distance value is set equal to the desired encoder count value minus the current encoder count value and the overshoot value is set equal to the forward overshoot value. After the overshoot values have been set, the distance value is stored in the down-counter, i.e., the down-counter is set to the distance value. The reverse flag in the scratch pad memory is set to the direction retrieved from the direction table for this axis.

Next, a test is made to determine if the distance value is greater than one inch. If the distance value is greater than one inch, the program cycles to the portion of the move axis to programmed position subroutine illustrated in FIG. 15B and described below. If the distance is not greater than one inch, a test is made to determine if the distance is less than or equal to one-tenth of an inch. If the distance is less than or equal to one-tenth of an inch, the program exits the move axis to programmed position subroutine. The program exits the move axis to programmed position subroutine because positioning of the movable elements of a case handling machine to within one-tenth inch of their programmed position is adequately close. Greater accuracy is not required.

If the distance is not less than or equal to one-tenth of an inch, a test is made to determine if the distance is less than or equal to the overshoot distance plus two-tenths of an inch. If the distance is not less than or equal to the overshoot plug two-tenths of an inch, the move axis to programmed position subroutine cycles to the portion thereof illustrated in FIG. 15B and described below. If the distance is less than or equal to the overshoot plus two-tenths of an inch, the program cycles to the portion of the move axis to programmed position subroutine illustrated in FIG. 15C and described below.

The distance less than or equal to overshoot plus two-tenths of an inch test is intended to determine if the distance between the movable element and the programmed position is enough for the movable element to move directly to the programmed position. If the distance is less than or equal to the overshoot distance plus two-tenths of an inch, the movable element is too close to the programmed position to move directly to the programmed position because overshoot could not be avoided. In this case, the movable element is moved away from the programmed position prior to being moved to the programmed position. The steps followed to accomplish this result are illustrated in FIG. 5C and D and described below. If the distance between the movable element and the programmed position is more than the overshoot plus two-tenths of an inch, the movable element is moved directly to the programmed position by following the same steps that are followed if the distance is greater than one inch. These steps are illustrated in FIG. 15B and described next.

The first step of the portion of the move axis to programmed position subroutine illustrated in FIG. 15B is to set the count down-counter equal to the current down-counter value minus the overshoot value. Since the down-counter value prior to this step denoted the programmed position of the movable element, the new down-counter value is a corrected value that has been compensated for overshoot. Next, the motor flag is set. Then, a pass is made through the motor subroutine followed by a pass through the update subroutine. As illustrated in FIG. 11A and described above, the down-counter value is changed each time encoder pulses are recognized.

After the program exits the update subroutine, a test is made to determine if the down-counter value is equal to zero. If the down-counter value is not equal to zero, additional passes are made through the motor and update subroutines since the movable element is not at the position where the power applied to the drive motor is to end. When the down-counter value equals zero, the move axis to programmed position subroutine clears the motor and reverse flags. Then, another pass is made through the motor subroutine followed by a pass through the update subroutine. As a result, the application of power to the drive motor ends. Next, a test is made to determine if the moving flag is set. If the moving flag is set, further passes are made through the motor and update subroutines as movement slows down to a stop. When this occurs, as previously described, the moving flag is cleared. When the moving flag is clear, the move allowed flag is cleared and the program exits the move axis to programmed position subroutine.

In essence, the portion of the move axis to programmed position subroutine illustrated in FIG. 15B is similar to the home axis subroutine illustrated in FIG. 9. Both portions of the program control the actuation of the current axis drive motors such that the related movable element is moved to its correct position. In the case of FIG. 9, the movable element is moved to the home position. In the case of FIG. 15B, the movable axis is moved to the programmed position. Rather than ending drive motor control when energization to the motor terminates, drive motor control continues until the movement stops.

Figure 15C:
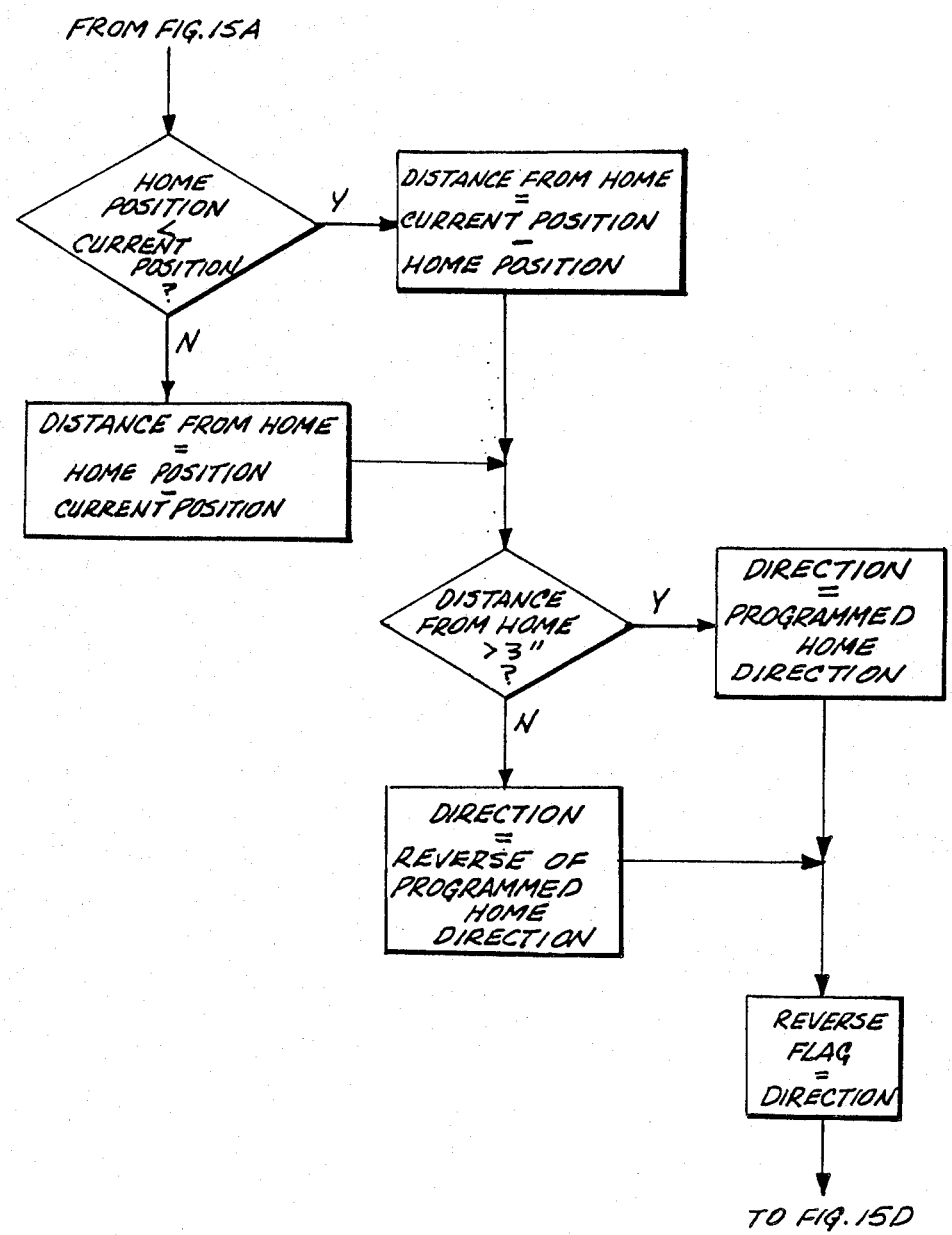

The first step of the portion of the move axis to programmed position subroutine illustrated in FIG. 15C is a test to determine if the home position of the movable element is less than the current position. If the home position is less than the current position, a value denoting the distance from home position is set equal to the current position minus the home position. If the distance from the home position is not less than the current position, the distance from home position value is set equal to the home position minus the current position. After the distance from home position value has been determined, a test is made to determine whether if the distance from home position value is greater than three inches. If the distance from home position value is greater than three inches, the direction of movement is set equal to the programmed home direction. If the distance from the home position is not greater than three inches, the direction of movement is set equal to the reverse of the home position. After the direction of movement has been determined, the reverse flag is set equal to the direction of movement. That is, the reverse flag is set to its reverse state if the direction of movement is to be the reverse direction and set to its forward state if the direction of movement is to be the forward direction.

As noted above, the portion of the move axis to programmed position subroutine illustrated in FIGS. 15C and 15D is designed to move the movable element away from its programmed position prior to moving the movable element to its programmed position. The part of the movable axis to programmed position subroutine illustrated in FIG. 15C and just described is designed to make certain that if the movable element is not more than three inches from its home position, the movement away from the programmed position is also away from the home position. If the movable element is more than three inches from its home position, the movement away from the programmed position is toward home position.

The first step in the portion of the move axis to programmed position subroutine illustrated in FIG. 15D is to set the down-counter value equal to a predetermined count value and the motor flag is set. For example, as indicated, the down-counter value can be set equal to 250. Then, a pass is made through the motor and update subroutines. As described above, this results in the motor being energized.

When the program exits the update subroutine, a test is made to determine if the down-counter value is equal to zero. As also described above, the down-counter value is changed during each pass through the update subroutine. If the down-counter value is not equal to zero, a further pass is made through the motor and update subroutines. The program continues this loop until the down-counter counts down to zero. When the down-counter count value becomes zero, the motor and reverse flags are cleared and a further pass is made through the motor and update subroutines fillowed by a test to determine if the moving flag is set. If the moving flag is set, another pass is made to the motor and update subroutine. This loop is followed until the moving flag is cleared, which occurs when movement of the movable element ends. When the moving flag is cleared, a pass is made through the get axes directions subroutine (FIG. 13); and, then, the move axis to programmed position subroutine cycles to the point in FIG. 15A where the direction of movement is looked up in the direction table by axis number.

After the move axis to programmed position subroutine is completed, as illustrated in FIG. 7, the move to box position subroutine tests the axis counter to determine if it is at its maximum value. If the axis counter is not at its maximum value, the axis counter is incremented and, after a predetermined delay, illustrated as .15 seconds, the next movement axis is looked up in the order of movement table. Then, a pass is made through the get axis parameters and the move axis to programmed position subroutines. The program continues to follow this loop until the axis counter reaches its maximum value. When the axis counter reaches its maximum value, the program leaves the move to box position subroutine and returns to the point in the main sequence of operation where a test is made to determine if the key switch is in the run position. At this point all of the movable elements have been moved to their programmed axis positions, i.e., the axis positions determined by the box number being displayed.

As will be readily appreciated from the foregoing description, the program portion of the invention provides a mechanism for programming the position of various movable elements along their axis of movements based on a box number value. The box number value is then utilized to control the movement of the movable element to their programmed positions. Hence the position of the movable elements of the case handling machine all correspond to a box number. Normally when the case handling machine is first powered up the movable elements are all moved to their home positions. Thereafter, the movable elements are moved to the displayed box position. If the displayed box position is changed, and the key switch is in the run position, the movable elements automatically move to their new positions, normally without first moving to their home positions. Element movement is accomplished in a manner that avoids conflicts. If a jam occurs during movement, power to the drive motor of the jammed axis terminates and a jam display occurs.

As previously described with respect to FIG. 4, when the key switch is in the program position, rather than entering the modify box parameter subroutine, a diagnostics subroutine can be entered. The diagnostics subroutine is entered when the box number is at its maximum value as shown in the lower right-hand corner of FIG. 4. In this regard, preferably, the box numbers vary from 00 to 99. The "maximum box value" lies between 99 and 00. This value can create a display, such as DIAG, for example, rather than creating a numerical display.

Figure 16A:
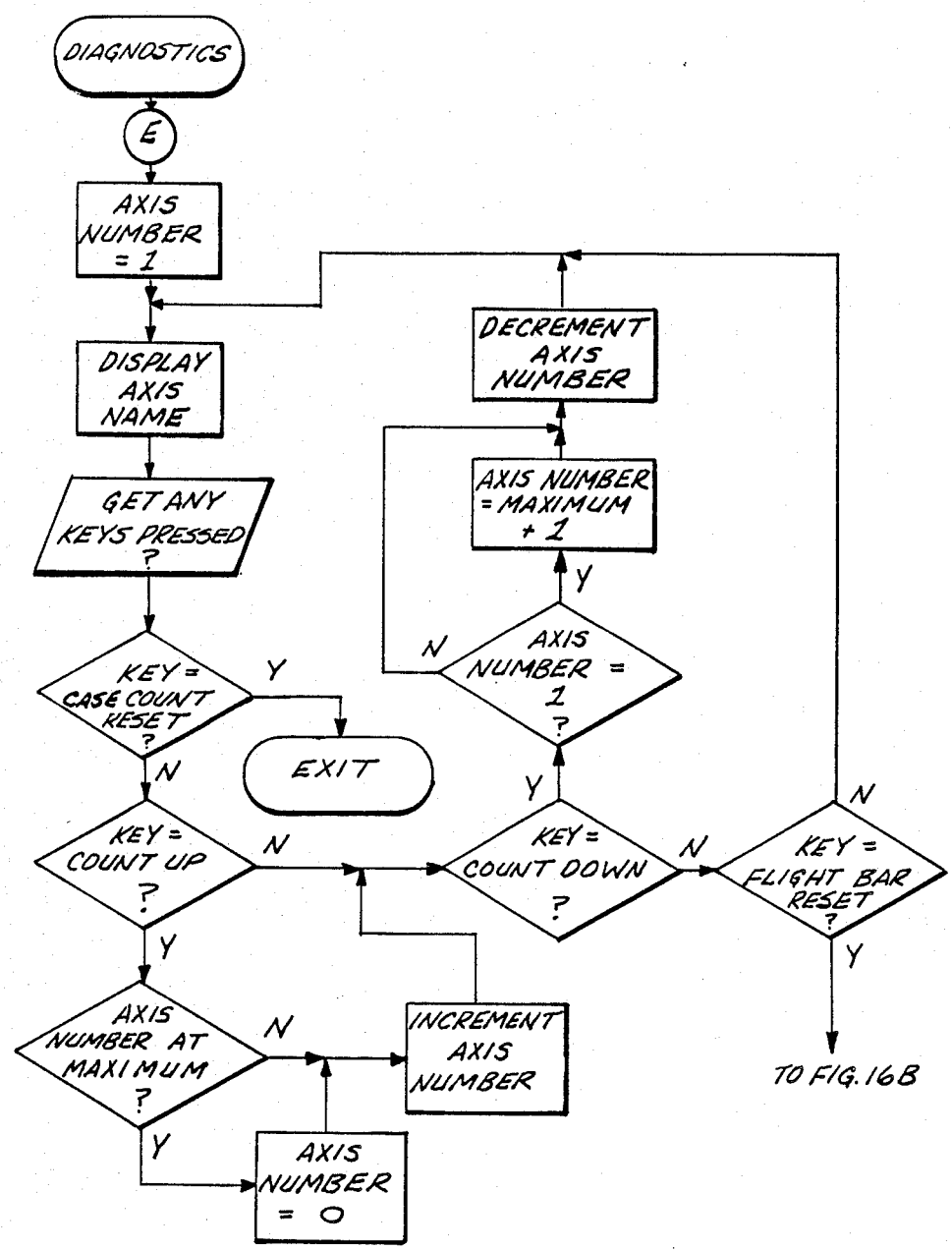
FIGS. 16A-B are flow diagrams of a diagnostic subroutine suitable for use in the main program illustrated in FIG. 4.
Figure 16B:
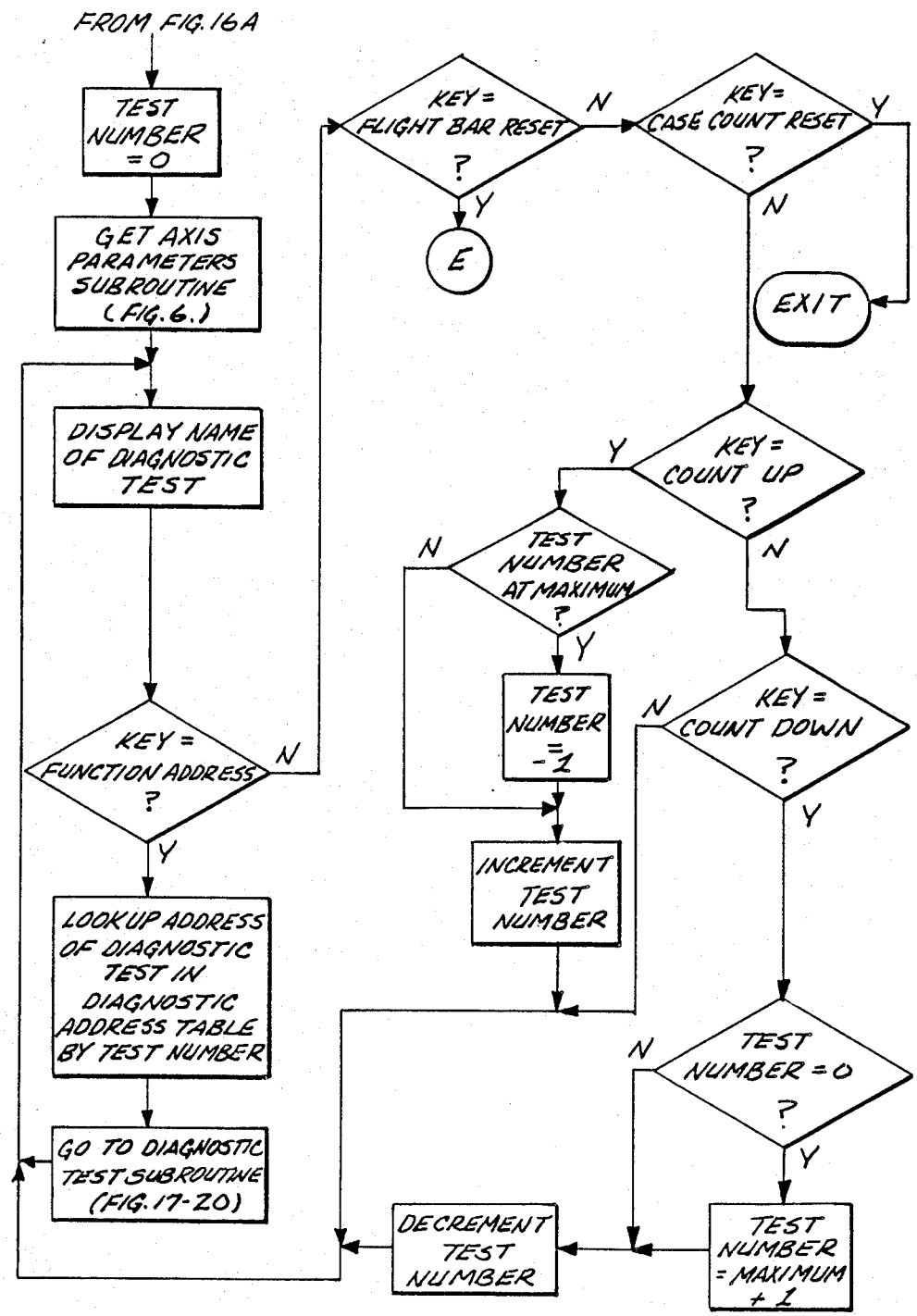

FIGS. 16A and 16B illustrates a diagnostics subroutine suitable for use in the embodiment of the invention being discussed. The first step of the diagnostics subroutine is to set the axis number equal to one. Thereafter, the name related to axis number 1 is displayed. Then, the program keys are tested. If the case count reset key is being passed, the program exits the diagnostics routine. If the case count key is not being pressed, a test is made to determine if the count up key is being pressed. If the count up key is being pressed, a test is made to determine if the axis number is at its maximum value. If the axis number is at its maximum value, the axis number is set equal to zero. If the axis number is not at its maximum value, or after the axis number has been set equal to zero, the axis number is incremented. After the axis number has been incremented, or if the count up key is not being pressed, a test is made to determine if the down key is being pressed.

If the down key is being pressed, a test is made to determine if the axis number is equal to one. If the axis number is equal to one, the axis number is set equal to its maximum value plus one. After the axis number has been set equal to its maximum value plus one, or if the axis number is not equal to one, the axis number is decremented. Thereafter, the program cycles to the point where the axis name is displayed. In essence, the just described portion of the diagnostics subroutine controls the incrementing and decrementing of the axis number based on the pressing of the count up and count down keys. Further, this portion of the diagnostics subroutine provides a mechanism for exiting the diagnostics subroutines when the case count reset key is pressed.

If the count down key is not being pressed, a test is made to determine if the flight bar key is being pressed. If the flight bar key is not being pressed, the program cycles to the point where the axis name is displayed. If the flight bar key is being pressed, the diagnostics subroutine cycles to the portion thereof illustrated in FIG. 16B.

The first step of the portion of the diagnostics subroutine illustrated in FIG. 16B is to set a test number equal to zero. The next step is a pass through the get axis parameters subroutine (FIG. 6). As a result, the axis parameter related to the current axis value are transferred into the scratch pad memory. Then, the name of the diagnostic test is displayed, i.e., the name of test number zero is displayed. Thereafter, the program keys are tested. If the function address key is being pressed, the address of the diagnostic test related to the diagnostic test number is looked up. Then, the appropriate diagnostic test illustrated in FIGS. 17-20 and described below is entered. After the thusly chosen diagnostic test is completed, the diatnostics subroutine cycles to the point where the name of the diagnostic test is displayed.

If the function address key is not being pressed, a test is made to determine if the flight bar reset key is being pressed. If the flight bar reset key is being pressed, the diagnostic routine cycles to the beginning of the diagnostics subroutine, point E in FIG. 15A. As a result, the operator can change the axis to be diagnosed, in the manner described above. If the flight bar reset key is not being pressed, a test is made to determine if the case count reset key is being pressed. If the case count reset key is being pressed, the program exits the diagnostics subroutine. Thus, pressing the case count reset key allows the operator to leave the diagnostics subroutine.

If the case count reset key is not being pressed, a test is made to determine if the count up key is being pressed. If the count up key is being pressed, a test is made to determine if the test number is at its maximum value. If the test number is at its maximum value, the test number is set equal to minus one. After the test number has been set equal to minus one, or if the test number is not at its maximum value, the test number is incremented. Thereafter, the diagnostics subroutine cycles to the point where the name of the diagnostic test is displayed.

If the count up key is not being pressed, a test is made to determine if the count down key is being pressed. If the count down key is being pressed, a test is made to determine if the test number is equal to zero. If the test number is equal to zero, the test number is set equal to the maximum test number value plus one. After the test number has been set equal to its maximum value plus one, or if the test number is not equal to zero, the test number is decremented. Thereafter, the program cycles to the point in the diagnostics subroutine where the name of the diagnostics test is displayed.

As will be readily appreciated from the foregoing description, the portion of the diagnostics subroutine illustrated in FIG. 16B controls which one of several diagnostic tests are selected, displays the name of the selected diagnostic test and implements the selected test.

FIG. 17 illustrates three diagnostics tests that are interrelated because they all control movement of the movable element along the axis being diagnosed. The tests are named the home axis test, the open axis test and the close axis test. When the home axis test selected by the diagnostics subroutine is chosen, the reverse flag is set equal to the programmed home direction and the homing flag is set; when the open axis test is selected, the reverse flag is cleared; and, when the close axis test is selected, the reverse flag is set. After one of these preliminary steps of the selected test is/are performed, each test follows a common drive motor actuation path that is similar to the drive motor actuation paths decribed above that are followed when the movable elements are homed or moved to their programmed position during the operation of the case handling machine. The first step is to set the motor flag. Thereafter, a pass is made through the motor and update subroutines. After the program exits the update subroutine, the function address key is tested to determine if it is being pressed. If the function address key is not being pressed, additional passes are made through the motor and update subroutines. When the function address key is pressed, the motor and reverse flags are cleared. Thereafter, a pass is made through the motor and updates the subroutines. After the program exits the update subroutine, a test is made to determine if the moving flag is set. If the moving flag is set, further passes are made through the motor and update subroutines. When movement stops and the moving flag is clear, the move allowed flag is set; and, the program exits the chosen diagnostic test.

As will be readily understood from the foregoing description, the diagnostic tests illustrated in FIG. 17 control movement of the movable element along the axis being diagnosed by energizing the related drive motor. Motor energization continues until the function address key is pressed. When the function address key is pressed, motor energization is terminated and diagnostic test cycles until movement stops.

Figures 18, 19:
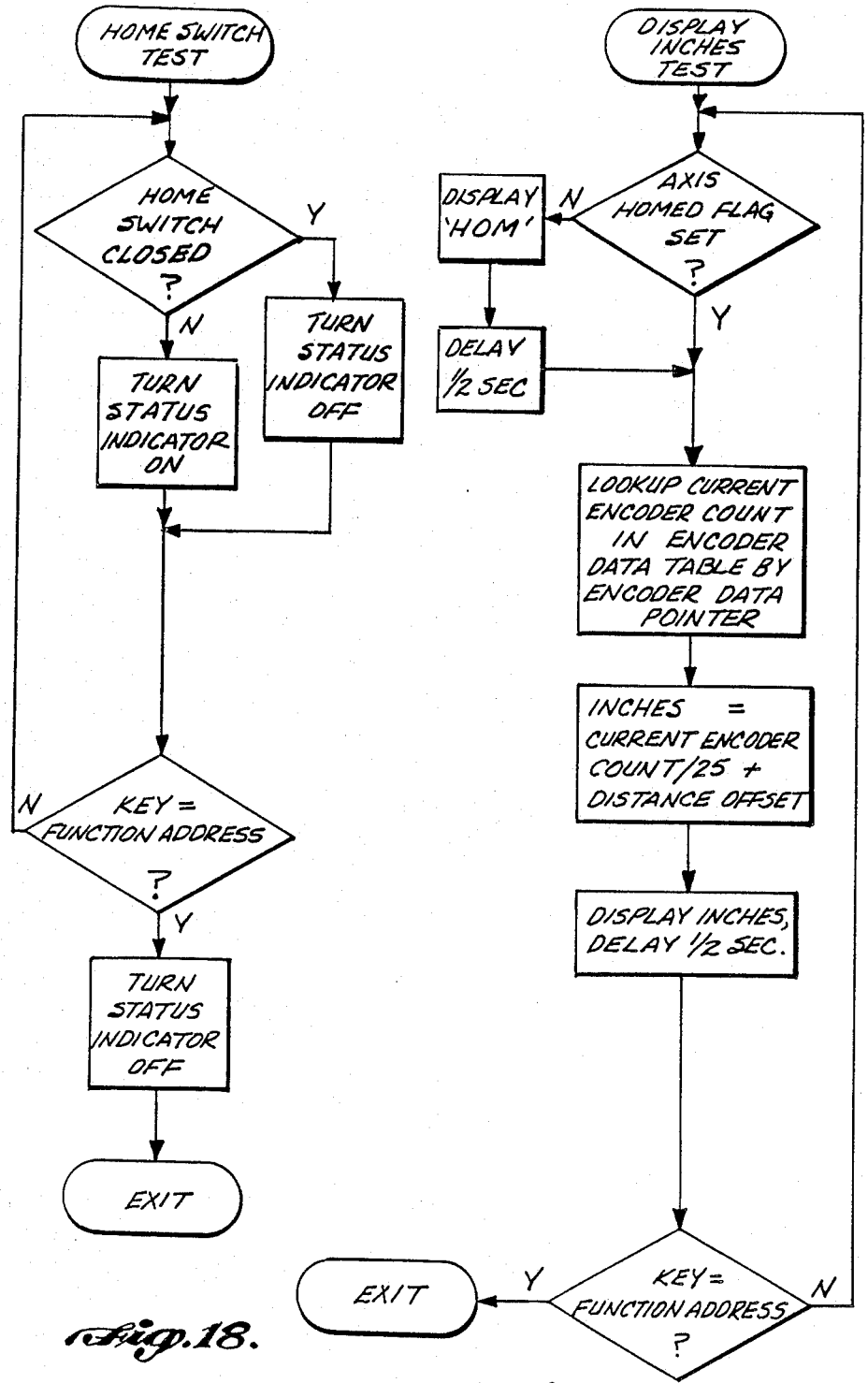
FIG. 18 is a flow diagrams of a home switch test subroutine suitable for use in the diagnostic subroutine illustrated in FIGS. 16A-B.
FIG. 19 is a flow diagram of a display inches test subroutine suitable for use in the diagnostic subroutine illustrated in FIGS. 16A-16B; and, FIG. 20 is a flow diagram of a display counts test subroutine suitable for use in the diagnostic subroutine illustrated in FIGS. 16A-16B.

FIG. 18 illustrates a home switch diagnostic test. When this diagnostic test is entered, a test is first made to determine if the home switch associated with the axis being diagnosed is actuated, i.e., closed. If the home switch is not closed, the status indicator on the CDU(-FIG. 3) is turned on. If the home switch is closed, the status indicator is turned off. After the status indicator is turned on or off, as determined by the status of the home switch, the function address key is tested to determine if it is being pressed. If the function address key is not being pressed, the home switch diagnostic test cycles to the point where the home switch closed test occurs. If the function address key is being pressed, the status indicator is turned off and the program exits the home switch diagnostics test.

FIG. 19 is a flow diagram of a display inches diagnostics test suitable for use in the diagnostics subroutine illustrated in FIG. 16. The first step of the display inches diagnostics test illustrated in FIG. 19 is to determine if the axis homed flag is set. If the axis homed flag is not set, a suitable display, such as HOM is created. Thereafter, a predetermined delay, illustrated as one-half second, occurs. If the axis homed flag is set, or after the delay, the current encoder count is looked up in the encoder data table based on the encoder data pointer value. Thereafter, the encoder value in terms of inches is determined by dividing the current encoder count value by 25. If an offset value is included for the axis being diagnosed, the offset value is subtracted from the result of the division. Then, the calculated inches value is displayed. After a further predetermined delay, illustrated as one-half second, the function address key is tested to determine if it is being pressed. Until the function address key is pressed, the display inches diagnostic test cycles to the point where the axis homed flag test occurs. When the function address key is pressed, the program exits the display inches diagnostic test.

Figure 20:
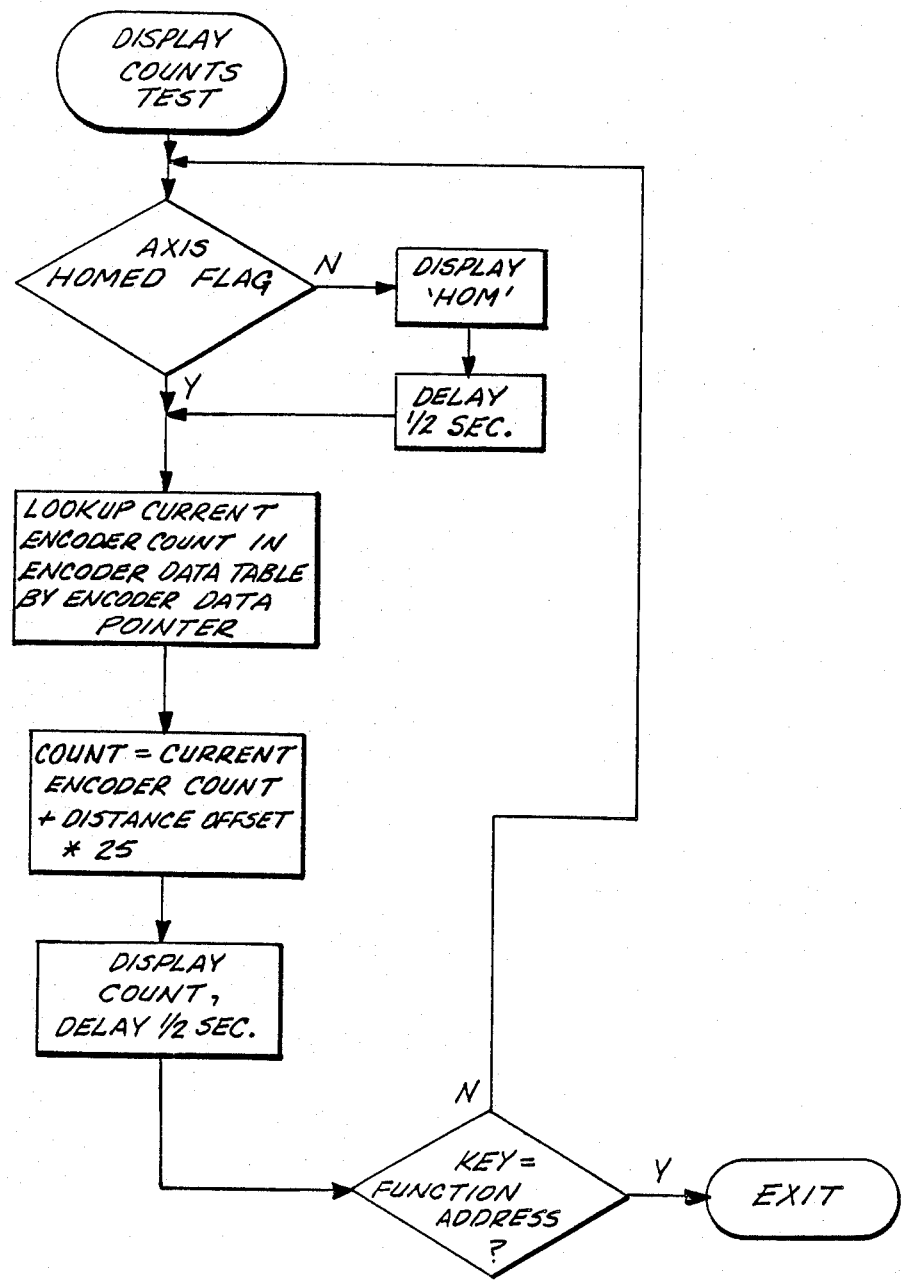

FIG. 20 is a flow diagram of a display counts diagnostic test suitable for use in the diagnostics subroutine. The first step of the display counts diagnostic test is to determine if the axis homed flag is set. If the axis homed flag is not set, a HOM display is created. Thereafter, a predetermined delay, illustrated as one-half second, occurs. If the axis homed flag is set, or after the delay, the current encoder count value is looked up in the encoder table based on the encoder data pointer value. Then, the count value is set equal to the current encoder count value plus any distance offset multiplied by 25. The multiplier 25 is included to convert the distance value, which is in inches, into a pulse count value. Then, the calculated count value is displayed. After another predetermined delay, also illustrated as one-half second, the function address key is tested. If the function address key is not being pressed, the display counts diagnostic test cycles to the point where the axis homed flag test occurs. If the function address key is being pressed, the program exits the display counts diagnostics test.

As will be readily appreciated from the foregoing description, the invention provides a controller for controlling the position of the adjustable elements of a case handling machine based on the size of the box to be handled by the machine. For programming purposes, box size is related to abox number. While the machine illustrated in FIG. 1 is a case set-up and bottom gluing machine, it is to be understood that the invention can be utilized with a variety of other types of case handling machines. Further, while preferred home switches are microswitches, as noted above, other types of position sensing switches, such as optical and inductive position sensing switches can be utilized if desired. In addition, while, at present, a string encoder having its body affixed to the case handling machine and the sensing end of the string attached to the movable element is preferred, if desired, other types of position encoders can be utilized. Consequently, within the scope of the appended claims it is to be understood that the invention can be practiced otherwise than as specifically described herein.

The embodiments of the invention in which an exclusive property or privilege is claimed are defined as follows:

1. In a case handling machine having a plurality of elements each movable along linear axes, the positions of said movable elements along their respective linear axes being determined by the size of a case to be handled by the machine, the improvement comprising a programmable controller including:
    (a) a plurality of electromechanical means, one of said electromechanical means coupled to each of said movable elements for moving said movable element along its linear axis;
    (b) a plurality of sensing means, one of said sensing means directly coupled to each of said movable elements for directly sensing the position of said movable element along its linear axis, each of said plurality of sensing means including a wire encoder for directly sensing the position of a related movable element along its linear axis, said wire encoders including an encoder body attached to the structure of said case handling machine and a wire extending from said encoder body to the related movable element; and,
    (c) a control system coupled to said plurality of sensing means for receiving movable element position data from said plurality of sensing means and coupled to said plurality of electromechanical means for controlling the position of said movable elements, said control system including a programmable central processing unit (CPU) and a control-display unit (CDU) for operator communication with the CPU, said programmable CPU including:
        (1) a modify box parameters subroutine that allows an operator to use the CDU to input to the CPU the position of each movable element for each box size to be handled, said CPU storing said movable element position data based on a box number identifier for each box size; and
        (2) a move to box position subroutine that uses the box number identifiers to access the movable element position data stored by the CPU for each box size and use the movable element position data to control the position of the movable elements.

2. The improvement claimed in claim 1 wherein each of said plurality of electromechanical means includes:
    an axis drive motor mechanically coupled to a related movable element; and
    a motor relay electrically coupled to said axis drive motor for selectively applying electric power from a source to said axis drive motor, said axis motor relay also coupled to said control system such that said axis motor relay is controllable by said control system to apply power to said axis drive motor when commanded to do so by said CPU.

3. The improvement claimed in claim 2 wherein said electromechanical means also includes a reverse relay connected between said source of electric power and said motor relays for controlling the polarity of the electric power applied to said axis drive motors by said motor relays, said reverse relay also coupled to said control system such that the polarity configuration of said reverse relay is controllable by said CPU.

4. The improvement claimed in claim 3 wherein said electromechanical means also includes a main power relay connected between said source of electric power and said reverse relay for supplying power to said axis drive motors via said motor relays and said reverse relay, said main power relay coupled to said control system such that the supplying of power by said main power relay is controllable by said CPU.

5. The improvement claimed in claim 4 wherein each one of said plurality of sensing means also includes a plurality of home switches, one of said home switches positioned to be closed by a related movable element.

6. The improvement claimed in claim 5 wherein said move to box position subroutine includes a home all axes subroutine that controls the movement of said movable elements to a home position defined by actuation of said home position switches by selectively controlling the energization of said axis drive motors by controlling the status of said motor relays, said reverse relay and said main power relay.

7. The improvement claimed in claim 6 wherein said move to box position subroutine also includes:
    a get axis direction subroutine that determines the direction of movement required for the movable elements to move from a present position to a programmed position based on a new box number; and
    an order of axes movements subroutine that analyzes the direction of movement of the movble elements determined by the get axis direction subroutine and determines a sequence of movement of the movable elements in a manner that avoids conflicts between the movable elements when they are moved.

8. The improvement claimed in claim 7 wherein said move to box position subroutine also includes:
    a move axis to programmed position subroutine that controls the movement of the movable elements along their linear axes by controlling the energization of said axis drive motors by controlling the status of said motor relays, said reverse relay and said main power relay, the status of said motor relays being controlled such that said movable elements are moved in the sequence of movement determined by said order of axes movements subroutine.

9. The improvement claimed in claim 8 wherein said move axis to program position subroutine includes:
    a motor subroutine that controls the energization and direction of rotation of the shafts of said drive motors by selectively controlling the closure of said axis motor relays, the state of said reverse relay and the closure of said main power relay, said motor subroutine including a count down timer that is set to the closure time of said motor relays and the change of state of said reverse relay, said count down timer controlling the closure of said motor relays and the change of state of said reverse relay such that the motor relay associated with an axis of movement is closed and the status of said reverse relay is set before said main power relay is closed; and, an update subroutine for controlling the counting down of said count down timer.

10. The improvement claimed in claim 9 wherein:

said motor subroutine also includes a second count down timer that is set to the up-to-speed delay time of sid axis drive motor when a drive motor is first energized; and said update subroutine decrements said second count down timer beginning when an axis drive motor is first energized.

11. The improvement claimed in claim 10 wherein:
(a) said update subroutine:
   (i) includes a speed counter that is incremented or decremented based on the rate of speed of movement of a movable element;
   (ii) tests said speed counter after said second count down timer has counted down to zero after a drive motor is energized; and,
   (iii) sets a jam flag if said speed counter value drops below a minimun value; and,
(b) said motor subroutine tests said jam flag and terminates the application of power to an energized axis drive motor when said jam flag is detected by controlling the status of said motor, reverse and main power relays.

12. The improvement claimed in claim 1 wherein each one of said plurality of sensing means also includes a plurality of home switches, one of said home switches positioned to be closed by a related movable element.

* * * * *

UNITED STATES PATENT AND TRADEMARK OFFICE
CERTIFICATE OF CORRECTION

PATENT NO. : 4,821,203

DATED : April 11, 1989

INVENTOR(S) : Carlton et al.

It is certified that error appears in the above-identified patent and that said Letters Patent is hereby corrected as shown below:

```
Column 8,  line 53:  "197" should be --107--
Column 12, line 59:  "ponter" should be --pointer--
Column 12, line 62:  "printer" should be --pointer--
Column 13, line 44:  "MOD" should be --MOD?--
Column 20, line 61:  "updata" should be --update--
Column 21, line 4:   "updata" should be --update--
Column 23, line 51:  after "if" insert --movement of--
Column 24, line 3:   after "order" insert --table--

Column 28, line 9:   "passed"  should be --pressed--
Column 33, line 6:   "sid" should be --said--
```

Signed and Sealed this

Twenty-fourth Day of April, 1990

Attest:

HARRY F. MANBECK, JR.

*Attesting Officer*        *Commissioner of Patents and Trademarks*